United States Patent
Schilit et al.

(10) Patent No.: US 8,565,791 B1
(45) Date of Patent: Oct. 22, 2013

(54) COMPUTING DEVICE INTERACTION WITH VISUAL MEDIA

(75) Inventors: William Noah Schilit, Mountain View, CA (US); Roy Want, Los Altos, CA (US); Yang Li, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/611,983

(22) Filed: Sep. 12, 2012

Related U.S. Application Data

(60) Provisional application No. 61/594,227, filed on Feb. 2, 2012.

(51) Int. Cl.
*H04W 24/00* (2009.01)

(52) U.S. Cl.
USPC .............. 455/456.3; 456/41.1; 456/414.1; 456/556.1; 456/558

(58) Field of Classification Search
CPC .................................................. H04W 76/02
USPC ......... 455/456, 41.1, 41.2, 414.1, 558, 556.1, 455/456.3
See application file for complete search history.

(56) References Cited

U.S. PATENT DOCUMENTS

| | | | |
|---|---|---|---|
| 7,145,454 B2 | 12/2006 | Linjama et al. | |
| 7,538,686 B2 | 5/2009 | Yeh et al. | |
| 7,756,467 B2 | 7/2010 | Bent et al. | |
| 7,873,849 B2 | 1/2011 | Mucignat et al. | |
| 8,264,529 B2* | 9/2012 | Goulart et al. | 348/61 |
| 2001/0049268 A1 | 12/2001 | Kobayashi | |
| 2003/0001018 A1 | 1/2003 | Hussey et al. | |
| 2003/0008692 A1 | 1/2003 | Phelan | |
| 2003/0046700 A1 | 3/2003 | Wilcox et al. | |
| 2003/0132974 A1 | 7/2003 | Bodin | |
| 2004/0116074 A1 | 6/2004 | Fujii et al. | |
| 2004/0146909 A1 | 7/2004 | Duong et al. | |
| 2004/0174400 A1 | 9/2004 | Herigstad et al. | |
| 2004/0194028 A1* | 9/2004 | O'Brien | 715/517 |
| 2005/0030201 A1 | 2/2005 | Bridgelall | |
| 2005/0174324 A1 | 8/2005 | Liberty et al. | |
| 2006/0022800 A1 | 2/2006 | Krishna et al. | |
| 2006/0084409 A1 | 4/2006 | Ghadiali | |
| 2006/0092072 A1 | 5/2006 | Steiner | |
| 2006/0227365 A1* | 10/2006 | Hohensee et al. | 358/1.15 |
| 2006/0237537 A1* | 10/2006 | Empedocles et al. | 235/439 |
| 2006/0242607 A1 | 10/2006 | Hudson | |

(Continued)

OTHER PUBLICATIONS

U.S. Appl. No. 13/612,308, by William Noah Schilit, filed Sep. 12, 2012.

(Continued)

*Primary Examiner* — Joseph Arevalo
(74) *Attorney, Agent, or Firm* — Shumaker & Sieffert, P.A.

(57) ABSTRACT

In general, techniques and systems for retrieving supplemental information associated with visual media are described. In one example, a method includes obtaining, by a computing device, position information from a position device using near-field communication (NFC), wherein the position information identifies a position of the position device in relation to a portion of visual media associated with the position device. The method may also include receiving, by the computing device, supplemental information that is provided by a networked device based at least in part on the position information, wherein the supplemental information comprises additional information related to the portion of the visual media. In some examples, the position device is included within an array of position devices mounted behind the visual media.

19 Claims, 12 Drawing Sheets

(56) References Cited

U.S. PATENT DOCUMENTS

| | | | |
|---|---|---|---|
| 2006/0261928 A1 | 11/2006 | Solberg et al. | |
| 2007/0109124 A1 | 5/2007 | Park et al. | |
| 2007/0124503 A1 | 5/2007 | Ramos et al. | |
| 2007/0145152 A1 | 6/2007 | Jogand-Coulomb et al. | |
| 2007/0176824 A1* | 8/2007 | Stumbo et al. | 342/372 |
| 2007/0188444 A1* | 8/2007 | Vale et al. | 345/156 |
| 2008/0021876 A1 | 1/2008 | Ahern et al. | |
| 2008/0076505 A1 | 3/2008 | Nguyen et al. | |
| 2008/0093447 A1 | 4/2008 | Johnson et al. | |
| 2008/0162141 A1 | 7/2008 | Lortz | |
| 2008/0262928 A1* | 10/2008 | Michaelis | 705/14 |
| 2009/0037326 A1 | 2/2009 | Chitti et al. | |
| 2009/0044123 A1* | 2/2009 | Tilton et al. | 715/732 |
| 2009/0303004 A1 | 12/2009 | Tuttle | |
| 2010/0081375 A1 | 4/2010 | Rosenblatt et al. | |
| 2010/0161410 A1 | 6/2010 | Tulloch | |
| 2010/0184372 A1* | 7/2010 | Tabaaloute | 455/41.1 |
| 2010/0214398 A1* | 8/2010 | Goulart et al. | 348/61 |
| 2010/0241494 A1 | 9/2010 | Kumar et al. | |
| 2010/0294840 A1 | 11/2010 | Barry | |
| 2011/0037609 A1 | 2/2011 | Kim et al. | |
| 2011/0083111 A1* | 4/2011 | Forutanpour et al. | 715/863 |
| 2011/0095873 A1 | 4/2011 | Pratt et al. | |
| 2011/0102455 A1 | 5/2011 | Temple | |
| 2011/0106635 A1 | 5/2011 | Khan et al. | |
| 2011/0109546 A1 | 5/2011 | Milne et al. | |
| 2011/0185607 A1 | 8/2011 | Forster et al. | |
| 2011/0212688 A1 | 9/2011 | Griffin et al. | |
| 2011/0276511 A1* | 11/2011 | Rosenberg | 705/345 |
| 2011/0320293 A1* | 12/2011 | Khan | 705/16 |
| 2012/0029997 A1* | 2/2012 | Khan et al. | 705/14.27 |
| 2012/0044059 A1 | 2/2012 | Saros et al. | |
| 2012/0045989 A1 | 2/2012 | Suumaki et al. | |
| 2012/0084302 A1* | 4/2012 | Murdock et al. | 707/754 |
| 2012/0094596 A1* | 4/2012 | Tysowski | 455/41.1 |
| 2012/0094597 A1* | 4/2012 | Tysowski | 455/41.1 |
| 2012/0094598 A1* | 4/2012 | Tysowski | 455/41.1 |
| 2012/0150601 A1* | 6/2012 | Fisher | 705/14.23 |
| 2012/0167146 A1* | 6/2012 | Incorvia | 725/60 |
| 2012/0183941 A1 | 7/2012 | Steinmetz | |
| 2012/0198504 A1* | 8/2012 | Tabaaloute | 725/81 |
| 2012/0239760 A1* | 9/2012 | Sjarif et al. | 709/206 |
| 2012/0242481 A1* | 9/2012 | Gernandt et al. | 340/539.13 |
| 2012/0242846 A1 | 9/2012 | Iwase | |
| 2012/0245990 A1* | 9/2012 | Agarwal | 705/14.25 |
| 2012/0317194 A1* | 12/2012 | Tian | 709/204 |

OTHER PUBLICATIONS

U.S. Appl. No. 13/612,169, by William Noah Schilit, filed Sep. 12, 2012.
U.S. Appl. No. 13/612,166, by Roy Want, filed Sep. 12, 2012.
U.S. Appl. No. 13/612,311, by Richard Carl Gossweiler III, filed Sep. 12, 2012.
U.S. Appl. No. 13/612,427, by Roy Want, filed Sep. 12, 2012.
U.S. Appl. No. 13/612,386, by Roy Want, filed Sep. 12, 2012.
Broll et al., "Mobile and Physical User Interfaces for NFC-based Mobile Interaction with Multiple Tags," MobileHCI' 10, Sep. 7-10, 2010, 10 pp.
"Near Field Communication," found at http://acuitydesign.eu/near-field-communication.html, accessed on Jan. 20, 2012, 1 p.
Broll et al., "Dynamic NFC-Displays as a Prototyping Platform for Direct Mobile Interactions with Public Displays," UbiComp'10, Sep. 26-29, 2010, 4 pp.
Broll et al., Design and Evaluation of Techniques for Mobile Interaction with Dynamic NFC-Displays, TEI' 11, Jan. 22-26, 2011, Funchal, Portugal, 8 pp.
Pering et al., "Gesture Connect: Facilitating Tangible Interaction With a Flick of the Wrist," Proceedings of the 1st international conference on Tangible and embedded interaction, Feb. 2007, 4 pp.
"Cirque Innovative Touch Solutions," Glidepoint NFC™, found at http://www.cirque.com/technologies/glidepointnfc.aspx, copyright 2009, accessed on Jan. 20, 2012, 2 pp.
Sanchez et al., "Touch & Control: Interacting with Services by Touching RFID Tags," Proceeding of IWRT, Dec. 2008, 10 pp.
"Future Forecasting: Near Field Communication (NFC) in mLearning," found at https://instructionaldesignfusions.wordpress.com/tag/nfc-tags/, Dec. 26, 2010, 9 pp.
"NFC Tags and QR Codes create Smart Signs & Smart Posters," found at http://www.redirectware.com/signs-posters.htm, accessed on Sep. 9, 2011, 2 pp.
"Mobile contactless services and NFC Smart Posters to change people's daily lives," by Fred Bear, Online-News-Today, found at http://nfcdata.com/blog/2011/02/18/mobile-contactless-services-and-nfc-smart-posters-to-change-people%e2%80%99s-daily-lives/, Feb. 18, 2011, 2 pp.
Office Action from U.S. Appl. No. 13/612,308, dated Nov. 15, 2012, 22 pp.
Response to Office Action dated Nov. 15, 2012, from U.S. Appl. No. 13/612,308, filed Feb. 15, 2013, 12 pp.
Office Action from U.S. Appl. No. 13/612,169, dated Nov. 26, 2012, 12 pp.
Response to Office Action dated Nov. 26, 2012. from U.S. Appl. No. 13/612,169, filed Feb. 26, 2013, 12 pp.
Office Action from U.S. Appl. No. 13/612,311, dated Nov. 28, 2012, 26 pp.
Response to Office Action dated Nov. 28, 2012, from U.S. Appl. No. 13/612,311, filed Feb. 28, 2013, 14 pp.
Office Action from U.S. Appl. No. 13/612,427, dated Dec. 11, 2012, 13 pp.
Response to Office Action dated Dec. 11, 2012, from U.S. Appl. No. 13/612,427, filed Mar. 11, 2013, 14 pp.
Office Action from U.S. Appl. No. 13/612,386, dated Nov. 23, 2012, 18 pp.
Response to Office Action dated Nov. 23, 2012, from U.S. Appl. No. 13/612,386, filed Feb. 25, 2013, 12 pp.
Choi et al., "Beatbox Music Phone: Gesture-based Interactive Mobile Phone using a Tri-axis Accelerometer," IEEE, Dec. 2005, 6 pp.
Ballagas, "Sweep and Point & Shoot: Phoneca-Based Interactions for Large Public Displays," Chi, Apr. 7, 2005, 4 pp.
International Search Report and Written Opinion of International Application No. PCT/US2013/020156, dated Mar. 26, 2013, 11 pp.
Office Action from U.S. Appl. No. 13/612,308, dated Mar. 1, 2013, 23 pp.

* cited by examiner

COMPUTING DEVICE INTERACTION WITH VISUAL MEDIA

This application claims the benefit of U.S. Provisional Application No. 61/594,227, filed Feb. 2, 2012, the entire content of each of which is incorporated herein by reference.

TECHNICAL FIELD

This disclosure relates to retrieving information associated with visual media using a computing device.

BACKGROUND

A user may interact with applications executing on a computing device (e.g., mobile phone, tablet computer, smart phone, or the like). For instance, a user may install, view, or delete an application on a computing device.

In some instances, a user may use a mobile computing device (e.g., mobile phone, tablet computer, smart phone, or the like) to communicate with other devices or systems. For instance, a user may transmit information from the mobile device to a remote computing device.

SUMMARY

In one example, a method includes obtaining, by a computing device, position information from a position device using near-field communication, wherein the position information identifies a position of the position device in relation to a portion of visual media associated with the position device, and receiving, by the computing device, supplemental information that is provided by a networked device based at least in part on the position information, wherein the supplemental information comprises additional information related to the portion of the visual media.

In another example, a computer-readable storage medium is encoded with instructions that cause one or more processors of a computing device to perform operations to obtain, by the computing device, position information from a position device using near-field communication, wherein the position information identifies a position of the position device in relation to a portion of visual media associated with the position device, and receive, by the computing device, supplemental information that is provided by a networked device based at least in part on the position information, wherein the supplemental information comprises additional information related to a portion of the visual media.

In another example, a computing device includes a near-field communication module configured to obtain position information from a position device using near-field communication, wherein the position information identifies a position of the position device in relation to a portion of visual media associated with the position device, and a processor configured to receive supplemental information that is provided by a networked device based at least in part on the position information, wherein the supplemental information comprises additional information related to the portion of the visual media.

In another example, a method includes obtaining, by a computing device, information from a position device using near-field communication, wherein the information identifies a position of the position device within an array of position devices associated with a visual representation of a control parameter that at least partially defines operation of a target device, and transmitting the information from the computing device to a networked device configured to adjust the control parameter based at least in part on the information.

In another example, a computer-readable storage medium encoded with instructions that cause one or more processors of a computing device to obtain information from a position device using near-field communication, wherein the information identifies a position of the position device within an array of position devices associated with a visual representation of a control parameter that at least partially defines operation of a target device, and transmit the information from the computing device to a networked device configured to adjust the control parameter based at least in part on the information.

In another example, a computing device includes a near-field communication module configured to obtain information from a position device using near-field communication, wherein the information identifies a position of the position device within an array of position devices associated with a visual representation of a control parameter that at least partially defines operation of a target device, and at least one processor configured to transmit the information from the computing device to a networked device configured to adjust the control parameter based at least in part on the information.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1:
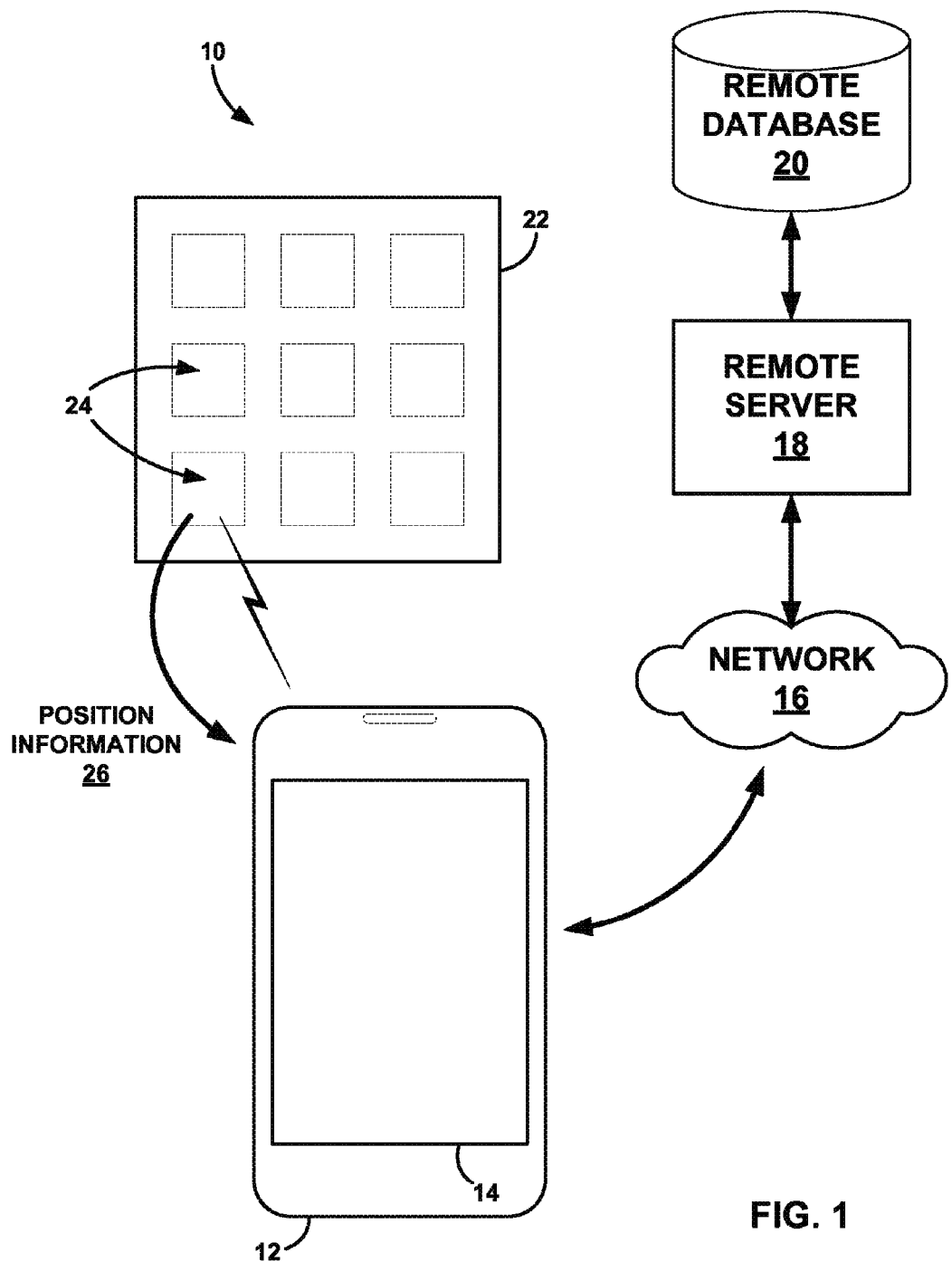
FIG. 1 is a conceptual diagram illustrating an example computing device that is configured to receive supplemental information based on position information obtained from a position device, in accordance with one or more aspects of the present disclosure.

In general, this disclosure is directed to techniques for distributing supplemental information related to visual media to a computing device. Typically, a printed poster or advertisement may include a printed code or an attached short-range communication tag to allow a user to access different information (e.g., over a network) than the information provided by the printed poster. The user may be able to access information related to several different areas of the printed poster, but each area of the poster includes a separate code or tag that provides information about the respective areas of the printed poster. The poster also visually indicates where each code or tag is located on the poster so that the user can find and access each code or tag. This indication may interfere with the visual presentation and aesthetics of the printed poster.

Techniques of this disclosure may, in various instances, facilitate access to supplemental information related to portions of visual media using one or more position devices (e.g., near-field communication (NFC) tags). Visual media (e.g., a printed poster or electronic display) may be mounted to a mounting surface that includes one or more position devices. The position devices may be arranged in an array covering a substantial portion of the mounting surface. The visual media may then be registered, mapped, or otherwise associated to the mounting surface such that a position of a particular position device may correlate to a particular portion of the visual media. The visual media then does not need to include separate codes or tags to distribute supplemental information to a user. Instead, the visual media may be replaced with different visual media having portions that are again associated with the array of position devices.

A user may retrieve supplemental information related to one or more portions of the visual media using the one or more position devices (e.g., passive NFC tags) of the mounting surface. For example, the user may place a computing device (e.g., a mobile device) in proximity to a portion of the visual media that interests the user. The computing device may then obtain position information from the position devices nearest the computing device on the mounting surface behind the visual media. The computing device may transmit the position information to a networked device (e.g., a server) and subsequently receive, based on the position information, supplemental information related to the portion of the visual media that interested the user. To retrieve supplemental information related to portions of the visual media between position devices, a sensor within the computing device may detect movement of the computing device from the previous position device. The computing device may then transmit information that includes or indicates the detected movement and obtain new position information to resolve the user intended portion of the visual media based on the detected movement.

In addition to obtaining supplemental information using position devices, this disclosure also describes techniques for controlling a target device using a plurality of position devices. Typically, a target device (e.g., an entertainment system or room lighting control system) may be controlled using a controller that adjusts one or more control parameters of the target device (e.g., volume, channel, source, or lighting level). However, wired controllers require wires to be mounted between the controller and the target device and wireless controllers still require a power cable or other battery power source. Due to these constraints, conventional controllers may be inconvenient or impossible to install at certain desired locations within a room, building, or other space.

Techniques of this disclosure may, in various instances, enable a computing device to obtain information from position devices (e.g., passive near-field communication (NFC) tags) to control a parameter of a target device. A plurality of position devices may be associated with a visual representation of the control parameter to create a virtual controller. The computing device may move across the visual representation of the virtual controller in an action that may simulate moving a physical control button (e.g., a slide knob or rotating knob). As the computing device moves with respect to the visual representation, the computing device may obtain information from one or more of the position devices of the virtual controller as the computing device moves past each position device. In response to obtaining this information, the computing device may transmit the information to a networked device. Based on the transmitted information, the networked device may adjust the actual control parameter of target device. In this manner, virtual controllers may be placed anywhere in a room, building, or even outdoors without the need for wired connections or power supplies.

In addition to obtaining information from one or more position devices of the virtual controller, the computing device may utilize one or more sensors to resolve a more detailed position of the computing device with respect to the visual representation of the virtual controller. For example, the computing device may utilize an onboard accelerometer to detect accelerations, such as magnitude and direction, of the computing device after obtaining information from at least one of the position devices. By integrating the acceleration data over time, the computing device may be able to calculate the distance that the computing device has moved from the previous position device and transmit that distance to the networked device. The networked device may then correct the determined position of the computing device with respect to the visual representation and update the control parameter of the target device accordingly. The detected movement may provide more detailed adjustment of the control parameter and/or reduce the number of position devices used within the virtual controller.

FIG. 1 is a conceptual diagram illustrating an example computing device 12 that is configured to receive supplemental information based on position information 26 obtained from a position device 24. As shown in FIG. 1, system 10 includes computing device 12, visual media 22, position devices 24, network 16, remote server 18, and remote database 20. Computing device 12 may include user interface 14. Computing device 12, in some examples, is or is a part of a portable computing device (e.g., a mobile phone, a netbook, a notebook, or a tablet device). In other examples, computing device 12 may be at least a part of a digital camera, a music player, or any other device that a user may carry or move between or among different locations. Computing device 12 may also connect to network 16 (e.g., a wired or wireless network).

Computing device 12 may include a short-range communication module (not shown) capable of initiating wireless communication with position device 24, over a relatively short distance. For example, this short distance may be less than 100 meters, less than 10 meters, less than 1 meter, or even less than 10 centimeters. In some examples, computing device 12 may initiate communication with a position device 24 when computing device 12 is within, e.g., 5 centimeters of the position device. In this example, a user may place computing device 12 directly over or even touching visual media 22 such that computing device 12 may communicate with the position device at that particular location of computing device 12. If the user moves computing device 12 across visual media 22, computing device 12 may communicate with different position devices 24 as computing device 12 is moved.

As shown in FIG. 1, position devices 24 are arranged in an array behind visual media 22. The array of position devices 24 may be arranged with any number of devices and in pattern, such as grids, rows, arcs, circles, diagonals, and the like. In other examples, system may include only one position device 24. With a singular position device 24, computing device 12 may detect movement of the computing device from the position device in order to determine the actual position of computing device 12 in relation to the position device after the movement. Since each position device 24 may be relatively simple and configured to communicate with any number of computing devices, computing device 12 may be capable of establishing communication with hundreds, thousands, or even millions of different position devices.

As described herein, position devices 24 may be capable of short-range communication. One example of short-range communication is near-field communication (NFC). NFC communication can occur between two devices in different modes. For example, computing device 12 may operate in at least two different modes to communicate with position devices 24 using NFC. For example, computing device 12 and position devices 24 may be configured to operate in a passive mode and an active mode of operation. In an active mode of operation, computing device 12 may generate a first alternating magnetic field that is received by one of position devices 24 in physical proximity to computing device 12. In response, position device 24 may generate a second alternating magnetic field that is received by computing device 12. In this way, data may be communicated between computing device 12 and position device 24 such as using peer-to-peer communication. In the active mode, computing device 12 may also power or activate a passive device to retrieve data from the passive device, as further described below. In this manner, position device 24 may include passive near-field communication hardware.

In a passive mode of operation, load modulation techniques may be employed to facilitate data communication between computing device 12 and position device 24. In a passive mode, position device 24 does not actively generate an alternating magnetic field in response to the alternating magnetic field of computing device 12, but generates an alternating magnetic field as a result of the induced voltage and applied load at the receiver of position device 24. Instead, position device 24 may include electrical hardware (e.g., an NFC module) that generates a change in impedance in response to the alternating magnetic field generated by computing device 12. For example, computing device 12 may generate an alternating magnetic field that is received by position device 24. Electrical hardware in position device 24 may generate a change in impedance in response to the alternating magnetic field. The change in impedance may be detected by the NFC module of computing device 12. In this way, load modulation techniques may be used by computing device 12 to obtain position information 26 from each of position devices 24. In other words, computing device 12 may obtain position information 26 from position device 24, but position device 24 would not receive any data from computing device 12 in the passive mode. Other well-known modulation techniques including phase modulation and/or amplitude modulation (resulting from load modulation) may also be employed to facilitate data communication between computing device 12 and position device 24 in other examples.

Generally, each of position devices 24 may operate in passive mode. In passive mode, position devices 24 may be referred to as NFC tags or NFC targets. In other words, computing device 12 may include active NFC hardware and position devices 24 may include passive NFC hardware. Since a passive position devices 24 do not need a dedicated power supply, position devices 24 may be placed in a variety of locations, on any surface, or even as part of smaller items. For example, position devices 24 may be embodied as a sticker or adhesive poster that is placed on the wall of a building or on a mounting surface to which visual media 22 is attached. Passive position devices 24 may also be less expensive and more difficult to corrupt with computing device 12. In this manner, position devices 24 may include electrical hardware that generates a change in impedance in response to an alternating magnetic field. However, each of position devices 24 may be another computing device in other examples. For example, position devices 24 may each be a computing device that operates in a passive NFC mode and/or an active NFC mode. In other words, position devices 24 may include active NFC hardware. This active NFC hardware may be configured to emulate passive NFC hardware or participate in active near-field communication.

In an example of a passive position device 24, position device 24 may deliver position information 26 to computing device 12 in response to receiving an alternating magnetic field generated by the NFC module of computing device 12. In other words, position information 26 may be data stored on position device 24. Upon receiving the alternating magnetic field (e.g., receiving power sufficient to transmit data) computing device 12 may receive position information 26. In this manner, position device 24 may only be capable of delivering or sending position information 26 when computing device 12 is within close physical proximity to each respective position device 24. Although the user may physically touch, bump, or tap computing device 12 to position devices 24, computing device 12 may be capable of receiving position information 26 from position devices 24 without physically touching position devices 24.

Position information 26 may include the relative position of that particular position device 24 transmitting the position information within the array of position devices. In other words, position information 26 may be different for each of the position devices 24. Since the position information 26 for each position device 24 is unique from each other, the position information may be used to identify the particular portion of visual media 22 over which computing device 12 has been placed by the user. Although position information 26 may include a unique position of the respective position device 24, all position devices 24 associated with visual media 22 may also or instead include the same information that indicates the association with visual media 22.

Visual media 22 may be any structure that provides visual information to a user. For example, visual media 22 may be a printed poster, printed flyer, coated surface, electronic media (e.g., a liquid crystal display), or any other surface that includes visual information such as text, numbers, images, and the like. Visual media 22 may be directed to a single subject (e.g., a movie advertisement or a restaurant menu), or visual media 22 may include multiple subjects (e.g., different store advertisements or coupons). In any case, visual media 22 may be changed over time while each of position devices 24 may include the same position information 26 over time. Alternatively, visual media 22 may take the form of a weekly sales poster, an interactive item list for adding items to a shopping list, a building directory, or even photos of different people. Obtaining position information from any position devices associated with any of these items within visual media 22 may prompt remote server 18 to transmit supplemental information associated with the item of visual media 22.

Since position devices 24 may be located or positioned underneath or behind visual media 22, each of position devices 24 may indicate over which area of visual media 22 computing device 12 is located. Visual media 22 may be registered or otherwise mapped to the positions of position devices 24 using a networked service or other system that associates portions of visual media 22 to one or more portion devices 24. By merely moving computing device 12 over a portion of visual media 22, the user may obtain supplemental information from the position device 24 associated with that portion of visual media 22. Position devices 24 may be disposed behind visual media 22 or otherwise out of sight of the user. Since position devices 24 may be arranged in a pattern behind visual media 22, computing device 12 obtains position information 26 from a position device 24 without the user needing to know where any of the position devices 24 are located.

Position information 26 may include any information or data necessary for remote server 18 to identify the array of position devices 24 and the specific position of the interrogated position device 24 within the array of position devices. Position information 26 may be in the form of a uniform resource locator (URL) that includes a domain associated with position devices 24 and coordinates of the interrogated position device 24, for example. An example URL may include the domain of remote server 18, a destination of the service that maps position devices 24 to visual media 22, and coordinates of a specific position device. This example URL may take the form of: "http://www.domain.com/posterservice/coord?x=12&y=25." The x and y coordinates (e.g., x=12 and y=25) may indicate the relative location of the position device within the array of position devices responsible for transmitting the obtained position information 26. Alternatively, position information 26 may include other identifying information that identifies the group or array of position devices 24 and the relative location of the particular position device 24 within the array.

Once computing device 12 obtains position information 26 from at least one position device 24, computing device 12 may transmit position information 26 to remote server 18 using network 16. Network 16 may be any wired or wireless network that allows computing device 12 to access another computing device and/or the Internet. For example, computing device 12 may connect to network 16 to transmit position information 26 to remote server 18. Remote server 18 may then access remote database 20 to identify the association of the position device 24 with a particular portion of visual media 22 and retrieve the associated supplemental information. Remote server 18 may then transmit the supplemental information to computing device 12 using network 16. When computing device 12 receives the supplemental information from remote server 18, computing device 12 may display or otherwise present the supplemental information to the user. In one example, computing device 12 may use user interface 14 to present the supplemental information to the user. However, computing device 12 may additionally, or alternatively, use other output devices to present visual, audio, or even tactile feedback to the user according to the supplemental information.

In this manner, the ability of computer device 12 to access supplemental information using network 16 may increase an amount of information, a variety of information, and an accuracy of information available to the user based on the visual media. In other words, visual media 22 may not need to present every piece of information to the user. Instead, visual media 22 may be used to catch the user's attention and allow the user to retrieve the supplemental information as desired. The supplemental information may be more detailed, more recently updated, or provide interactive information that would otherwise be unavailable on visual media 22. For example, the supplemental information may include links to purchase an item, coupons, or upcoming scheduled events for the subject matter of the visual media 22. Since the supplemental information is stored by remote server 18, the supplemental information may be updated or changed at any time without physically altering visual media 22 or any of position devices 24. In other words, the supplemental information may be managed in a central server (e.g., remote server 18), a central database (e.g., remote database 20), or any web-based resource.

User interface 14 may include an input device and an output device so that the user can communicate with computing device 12. In one example, user interface 14 may be a touch screen interface. In other examples, user interface 14 may include a display and one or more buttons, pads, joysticks, mice, or any other device capable of turning user actions into electrical signals that control computing device 12. In addition, computing device 12 may include one or more microphones, speakers, cameras, or tactile feedback devices to deliver information to the user or receive information. In any example, the user may interact with user interface 14 to provide input during the check-in process. For example, user interface 14 may present the supplemental information to the user.

The position information 26 and supplemental information may be managed by a service. This service may be Internet-based and accessed by the user using an application, web browser, or any other user interface that enables the user to interact with the service. In some cases, the service may be accessed through a standalone application that is launched in response to position information 26 and operates with the operating system of computing device 12. Alternatively, the application may be a sub-routine built into an operating system running on computing device 12. In any case, computing device 12 may access the service to transmit position information and receive the supplemental information. The service may directly deliver the supplemental information or the service may redirect a web browser of computing device 12, for example, such that computing device 12 may receive the supplemental information from a different server and/or repository. Although a standalone application may be used to access the services, the operating system may include the required functionality to directly interface with the social networking service (e.g., directly calling application programming interfaces (APIs) of the service with the operating system of computing device 12).

Computing device 12 may also include techniques to handle errors when obtaining position information 26, transmitting the obtained position information 26, and or receiving the supplemental information. For example, computing device 12 may not recognize or be able to interpret position information 26 received from one of position devices 24. In this event, computing device 12 may prompt the user via user interface 14 to address this error in position information 26. For example, user interface 14 may prompt the user to reposition computing device 12 near the desired portion of visual media 22 or enable short-range communication if the feature is not enabled.

Remote server 18 and remote database 20 may each include one or more servers or databases, respectively. In this manner, remote server 18 and remote database 20 may be embodied as any hardware necessary to receive position information 26, store the association between position devices 24 and visual media, or transmit supplemental information to computing device 12 over network 16. Remote server 18 may include one or more desktop computers, mainframes, minicomputers, or other computing devices capable of executing computer instructions and storing data. Remote database 20 may include one or more memories, repositories, hard disks, or any other data storage device. In some examples, remote database 20 may be included within remote server 18.

Remote server 18 may connect to network 16. Network 16 may be embodied as one or more of the Internet, a wireless network, a wired network, a cellular network, or a fiber optic network. In other words, network 16 may be any data communication protocol that facilitates data between two or more devices.

In some examples, remote database 20 may include Relational Database Management System (RDBMS) software. In one example, remote database 20 may be a relational database and accessed using a Structured Query Language (SQL) interface that is well known in the art. Remote database 20 may alternatively be stored on a separate networked computing device and accessed by remote server 18 through a network interface or system bus. Remote database 20 may in other examples be an Object Database Management System (ODBMS), Online Analytical Processing (OLAP) database or other suitable data management system.

Therefore, as described herein, at least one position device 24 may be associated with visual media 22 such that computing device 12 may utilize position information 26 from position device 24 to retrieve supplemental information associated with visual media 22. The combination of position devices 24 and visual media 22 may be termed a "Smart Poster" because the poster is able to direct computing device 12 to additional information not presented by the visual information on visual media 22. The additional, or supplemental, information may be stored by remote server 18 and delivered to any computing device 12 that requests the supplemental information.

In one example, computing device 12 may obtain position information 26 from a position device 24 using NFC, wherein position information 26 identifies a position of position device 24 in relation to visual media 22 associated with position device 24. Position information 26 may indicate the relative location of position device 24 to visual media 22 and/or other position devices 24 when the position device is within an array of position devices. Computing device 12 may then transmit position information 26 to remote server 18 over network 16. In response to the transmitted position information 26, remote server 18 may transmit supplemental information back to computing device 12. Thus, computing device 12, or a processor of computing device 12, may receive supplemental information that is provided by remote server 18 (e.g., a networked device) based on position information 26. The supplemental information may include additional information related to a portion of visual media 22, such as text, images, or even another URL that directs computing device 12 to further supplemental information.

In another example, computing device 12 may include a computer-readable storage medium (e.g., a memory or removable media) encoded with instructions that cause one or more processors of computing device 12 to obtain position information 26 from a position device 24 using near-field communication, wherein position information 24 identifies a position of position device 24 in relation to visual media 22 associated with position device 24. The computer-readable storage medium may also include instructions that cause one or processors of computing device 12 to receive supplemental information provided by a networked device (e.g., remote server 18) based on position information 26. In some examples, computing device 12 may include a near-field communication module (not shown) that is configured to obtain position information 26 from a position device 24 using NFC. A processor of computing device 12 may also be configured to receive the supplemental information from remote server 18.

Each one of position devices 24 may be one of an array of position devices 24 associated with visual media 22. The array of position devices 24 may include two or more position devices 24 arranged in a configuration selected for use of the array. In one example, the array may include a plurality of position devices 24 arranged in a two-dimensional grid pattern, as shown in FIG. 1. However, the array may include position devices 24 in circular patterns, bunched patterns, linear patterns, random patterns, or patterns selected to match a shape of a wall or visual media 22. Each of position devices 24 may be associated to other position devices within the array. Although one position device may not specifically reference another position device, remote database 20, for example, may include information associating each of position devices 24 to the same visual media 22 and/or with respective distances and directions between each position device. Although system 10 may generally include an array of multiple position devices 24, system 10 may utilize only one position device 24 and detected motion of computer device 12 in other examples.

Visual media 22 may include a printed media or an electronic display. For example, a printed media of visual media 22 may include a single printed poster or multiple printed items. The printed media may include ink on a paper, canvas, vinyl, or any other backing material. In this manner, the printed media may include a static image. In another example, an electronic display of visual media 22 may provide a dynamic image. The electronic display may include a liquid crystal display (LCD), a plasma display, a projection display, or any other electronic device configured to produce a dynamic image.

Visual media 22 may also be mounted on a mounting surface (not shown) that includes position devices 24. The mounting surface may be a material to which each of position devices 24 may be attached, e.g., wood, plastic, paper, or stone. In this manner, the mounting surface may be a structure that can be hung on or otherwise attached to a wall. Alternatively, the mounting surface may be a wall itself. The mounting surface may include a recess for each of position devices 24 such that position devices 24 may be flush with the surface of the mounting surface. In other examples, position devices 24 may be attached to a generally planar mounting surface.

In general, visual media 22 and the mounting surface containing position devices 24 may be disposed in a single plane. In other words, visual media 22 may be a generally flat structure and position devices 24 may generally be disposed in a single plane. However, visual media 22 and the mounting surface of position devices 24 may be non-planar in other examples. For example, visual media 22 and position devices 24 may be configured into a cylindrical shape. In another example, visual media 22 and position devices may be configured into two or more planar sections joined by pointed or curved surfaces. Each of position devices 24 may be curved or planar in any of these examples. Visual media 22 may thus be disposed on a non-planar surface.

To identify specific portions, or hot spots, within visual media 22, each of position devices 24 may provide different position information 26 regarding the relative location of each specific position device to another position device. In one example, position information 26 from each of position devices 24 may include unique coordinates that identify the position of the respective position device 24 within the mounting surface and other position devices associated with visual media 22. The coordinates may identify the position of each respective position device 24 along an X and Y axis. Remote server 18 may then have each of position devices 24 mapped to respective locations of visual media 22. Alternatively, the coordinates may specify a measured location in both X and Y axes among the array of position devices 24. Instead of coordinates, position information 26 may merely identify the specific position device that is then mapped to locations of the mounting surface and visual media 22.

Computing device 12 may obtain position information 26 when computing device 12 is placed proximate to one of the position devices 24 and the desired portion of visual media 22. A user may hold computing device 12 in close proximity to a desired portion or area of visual media 22. The proximity between computing device 12 and each position device 24 may be a function of the signal producible by each position device 24 and any interference from visual media 22. For position devices configured to be interrogated using NFC, computing device 12 may need to be placed within 10 centimeters of a position device 24. In other examples, computing device 12 may need to be placed within 4 centimeters of a position device 24 to obtain position information 26. Although not necessary, computing device 12 may also touch, bump, or otherwise contact visual media 22 to obtain position information 26.

Position devices 24 may be capable of transmitting position information 26 over greater distances, e.g., greater than 10 centimeters. However, larger distances may allow computing device 12 to interrogate multiple position devices 24 at the same time. Obtaining position information 26 from multiple position devices 24 at the same time may complicate or even prevent the identification of the specific portion of visual media 22 in close proximity to computing device 12. It may be possible in other examples to identify a specific location of visual media 22 based on signal strength of each position information 26 received by computing device 12 (e.g., the strongest signal may be from the closest position device 24 to computing device 12). Alternatively, computing device 12 may determine the center point between all position devices 24 identified by the position information 26 obtained from multiple position devices 24 when computing device 12 remains stationary at one location with respect to visual media 22.

Computing device 12 may continue to obtain position information 26 from different position devices 24 when computing device 12 is moved to a different location with respect to visual media 22. Therefore, computing device 12 may obtain position information 26 from additional position devices, wherein position information 26 identifies the positions of the respective position devices 24 in relation to visual media 22. In other words, each of the position devices 24 may be associated with visual media 22, and computing device 12 may obtain position information from each position device 24 that comes within close proximity to computing device 12. Computing device 12 may transmit all of the position information 26 that has been obtained, either in real-time as position information 26 is obtained or in batches where each transmission includes position information from multiple position devices 24, to remote server 18. Computing device 12 may then retrieve supplemental information associated with a second portion, or multiple portions, of visual media 22 based on position information 26 from the additional position devices 24.

In this manner, computing device 12 may retrieve supplemental information associated with two or more portions of visual media 22. Whenever computing device 12 obtains position information 26 from a position device 24, computing device 12 may retrieve the corresponding supplemental information that has been mapped to or otherwise associated with that position device and portion of visual media 22. In some examples, computing device 12 may thus retrieve supplemental information for every position device 24 that computing device 12 has obtained position information 26.

In other examples, computing device 12 may be selective about when to obtain position information 26 and/or transmit position information 26 to retrieve supplemental information. Because the user may not want to retrieve all of the supplemental information for portions of visual media, computing device 12 may employ one or more techniques to distinguish between portions of visual media 22 of interest to the user and portions of visual media 22 merely located between two portions of interest. In one example, computing device 12 may monitor the duration in which computing device 12 is in communication with each position device 24. Computing device 12 may compare the duration to a threshold and only transmit position information 26 to remote server 18 when the duration exceeds the threshold. Since the user may pause at the desired portion of visual media 22, the threshold may be set so that supplemental information is only retrieved when the user pauses over the position device 24 for a sufficient duration. In other words, computing device 12 may interpret small durations of time in which a position device 24 is detected as a position device associated with a portion of visual media 22 not of interest to the user.

In another example, computing device 12 may monitor the motion of computing device 12 to determine which obtained position information 26 should be used to retrieve supplemental information. Computing device 12 may interpret instances when computing device 12 is relatively motionless or when computing device 12 changes direction of movement to be instances when the user was interested in a portion of visual media 22. Therefore, computing device 12 may transmit position information 26 obtained at those detected instances to remote server 18 for retrieving supplemental information.

In other examples, computing device 12 may transmit position information 26 in response to receiving a transmit input from the user. The transmit input may command computing device 12 to transmit position information 26. The user may provide the transmit input when the user has positioned computing device 12 in close proximity to the portion of visual media 22 of interest to the user. In this manner, computing device 12 may not transmit unnecessary position information and subsequently receive supplemental information of no interest to the user. In one example, the transmit input may be received from a physical button of computing device 12 or a soft button (e.g., a button presented on a touch screen display of user interface 14). Alternative to receiving the input from a button, the transmit input may be in the form of a "tap" or pattern of taps detected by an accelerometer that indicates the user desires supplemental information associated with the current position of computing device 12 with respect to visual media 22. In response to receiving the transmit input, computing device 12 may transmit the most recently obtained position information 26 (e.g., position information from the closest position device).

In alternative examples, the transmit input may be in the form of position information received from one or more of position devices 24. For example, computing device 12 may transmit the first position information 26 from the first position device of visual media 22 interrogated by computing device to remote server 18. Position information 26 may identify visual media 22. In return, computing device 12 may receive a filter or other such information that indicates which position devices 24 are associated with available supplemental information (e.g., hot spots of visual media 22). This filter or information may be in the form of a list of bounding rectangles (e.g., (x1,y1), (x2,y2)) or a list of each position device location (e.g., each coordinate position) associated with supplemental information. As computing device 12 receives position information 26, computing device 12 may only transmit position information received from position devices 24 that correspond to the identified bounding rectangles or locations. In this manner, computing device 12 may limit transmission of position information 26 to those instances where supplemental information is actually available from remote server 18.

Computing device 12 may also utilize detected or sensed movement or motion of the computing device to resolve a specific potion of visual media 22 for which to retrieve supplemental information. In other words, position devices 24 may not be provided close enough together or in a small enough size to provide the resolution needed to differentiate between specific portions of visual media 22. For example, a user may desire to retrieve supplemental information from a portion of visual media 22 that resides between two adjacent position devices 24. Computing device 12 may need additional information, such as information regarding the movement of computing device 12 from the previously detected position device 24, to resolve a more precise position of computing device 12 with respect to visual media 22.

Computing device 12 may thus detect movement of computing device 12 from the previous position device 24 and transmit position information 26 received from the previous position device and the detected movement (or information related to or indicative of the detected movement) to remote server 18. Remote server 18 may thus determine the position of computing device 12 with respect to visual media 22 by mapping the location of position device 24 from position information 26 and adding the detected movement to that mapped location. The detected movement may movement detected from an accelerometer, gyroscope, compass, or any other movement sensors. The accelerometer may include one or more three-axis accelerometers. In one example, computing device 12 may measure accelerations of computing device 12 after obtaining position information 26 and calculate the distance and direction computing device 12 was moved from the previously detected position device 24 based on the measured accelerations. The distance computing device 12 has been moved may be calculated by double integration of the accelerometer measurements. In addition, the direction may be determined integrating the acceleration measurements from the previous position device 24 and determining a speed vector in two or three dimensions.

In another example, computing device 12 may detect movement of computing device 12 by capturing a plurality of images with a sensor of the computing device. The sensor may be an image sensor disposed on a surface of computing device 12 that faces visual media 22 (e.g., a rear facing camera). From the captured images, computing device may analyze at least two of the captured images and calculate a distance and a direction that computing device 12 was moved from the previously detected position device 24 based on a rate and direction content of visual media 22 (e.g., a common feature of visual media presented in the images) has moved between the captured images. Each of the captured images may include at least a part of visual media 22.

Computing device 12 may, in one example, analyze the captured images for at least one common feature of visual media 22, identify at least one common feature between the images (e.g., common groups or patterns of pixels), count the number of pixel changes between each image, and estimate the movement of computing device 12 based on the number of counted pixels. In this manner, computing device 12 may calculate the distance and direction computing device 12 has moved from the distance and direction the at least one common feature has moved between the images. Computing device 12 may also employ other algorithms selected to convert feature movement between images to distance moved. These algorithms may incorporate additional data, such as focal length, to calibrate the distance per pixel calculation. In other words, larger focal lengths in the images may indicate a larger coverage length of visual media 22 for each pixel.

The movement detected by computing device 12 may allow remote server 18 to provide a more accurate position of computing device 12 with respect to visual media 22 and position devices 24. However, this estimation of movement may become less accurate over large distances. In this manner, computing device 12 or remote server 18 may use subsequently obtained position information 26 to correct the detected movement of computing device 12. After computing device 12 has obtained position information 26 from a position device 24, may obtain position information 26 from a subsequent position device 24 using near-field communication or another short-range communication protocol, where the subsequent position device 24 identifies a respective position of the position device in relation to visual media 22. Computing device 12 may then correct the detected movement based on a distance between the positions of the subsequent position device 24. In other examples, remote server 18 may correct the detected movement based on the subsequent position information received from computing device 12.

Although computing device 12 or remote server 18 may be configured to estimate the position of computing device 12 in relation to visual media 22 based on obtaining position information 26 from a single position device 24 and detecting computing device movement, such estimation may lose precision and/or accuracy as computing device 12 is moved over larger distances by the user. Therefore, even if detected movement can be used to determine the position of computing device 12, computing device 12 may be configured to continue obtaining position information 26 from subsequent position devices 24. In some examples, remote server 18 may request movement information from computing device 12. If remote server 18 recognizes that visual media 22 is associated with only a few position devices 24 or position devices 24 are separated by larger distances, remote server 18 may request the detected movement to more accurately determine the position of computing device 12. This request may command computing device 12 to begin detecting movement if such computing device 12 has not already activated the detection of movement. In other examples, computing device 12 may automatically begin detecting movement from one or more sensors upon initially obtaining position information 26.

As described herein, computing device 12 may obtain the supplemental information from remote server 18 in response to obtaining position information 26. The supplemental information may allow the user to view additional details or other information related to a portion of visual media 22. In some examples, the supplemental information transmitted to computing device 12 from remote server 18 may include data that is presentable to the user of computing device 12 via user interface 14 in the form of text, pictures, video, applications, purchasing information, etc. In other words, computing device 12 may be configured to display the supplemental information using user interface 14.

In other examples, supplemental information received by computing device 12 may include instructions or may be a pointing device that allows computing device 12 to obtain the additional information desired by the user. For example, the supplemental information may include a uniform resource locator (URL) that directs a browser of computing device 12 to web-based content associated with the portion of visual media 22 at least partially identified by position information 26. In other words, remote server 18 may transmit the URL or other pointing device associated with position information 26. Computing device 12 may then use the URL to obtain additional information (e.g., text, pictures, audio files, video, purchasing information) over network 16 from a source different than remote server 18. The URL may also command computing device 12 to open the web browser if one is not already available to the operating system of computing device 12. Supplemental information in the form of a URL may require computing device 12 to perform additional operations, but then remote server 18 may not need to store the additional details and maintain updated data. Instead, remote sever 18 may merely direct computing device 12 to an information source that maintains the updated information associated with visual media 22. In addition, the URL may allow computing device 12 to access interactive web-based content such as secure purchasing websites, dynamic schedules, or any other information available over network 16. Computing device 12 may display the URL, the pointing device, and/or the additional information obtained via the URL.

In some examples, position information 26 may include information that computing device 12 can use to directly obtain supplemental information associated with visual media 22. For example, position information 26 may include a URL selected to direct a browser of computing device 12 to remote server 18 (e.g., a networked device). Remote server 18 may also be controlled by a service (e.g., a networked service associated with visual media 22) that has mapped visual media 22 to position devices 24. Mapping visual media 22 to position devices 24 may include determining which position device is closest to areas of visual media 22 for which supplemental information will be available to a user of computing device 12. Supplemental information retrieved by computing device 12 using the URL of position information 26 may be a subset of supplemental information related to different portions of visual media 22 and stored by the service that includes remote server 18 and remote database 20. In other words, remote database 20 may store a complete set of supplemental information (e.g., text, images, video, and/or URLs) that is associated with the entire visual media 22. However, only a subset or portion of the supplemental information may be transmitted to computing device 12 in response to computing device 12 obtaining position information 26 from a specific position device 24.

System 10, and similar systems utilizing position devices 24, may be utilized to adjust a control parameter that defines operation of a target device (e.g., a sound system, a video system, a lighting system, a heating system, etc.). In other words, a user may adjust, modify, or change a control parameter of a target device by obtaining position information 26 from one or more position devices 24. Computing device 12 may obtain information from one or more position devices 24 using near-field communication. The information may identify a position of the respective position device within an array of position devices 24 associated with a visual representation of a control parameter that at least partially defines operation of a target device. Computing device 12 may then transmit the obtained information (e.g., position information 26) from computing device 12 to remote server 18 (e.g., a networked device) configured to adjust the control parameter based on the obtained information.

In some examples, computing device 12 may begin to adjust the control parameter after obtaining position information 26 from only one position device 24. In other examples, computing device 12 may adjust the control parameter based on obtaining position information 26 from two or more position devices. For example, computing device 12 may obtain a second set of information from a second position device of the plurality of position devices 24. Just like the position information 26 obtained from a previous position device 24, the second set of information (e.g., position information from a subsequent position device 24), identifies a position of the second position device in relation to the visual representation of the control parameter (e.g., visual media 22). Computing device 12 may then transmit the second set of information to remote server 18 that is configured to update the adjustment of the control parameter based on the second set of information. In this manner, computing device 12 may transmit newly obtained position information 26 from subsequent position devices 24 to remote server 18 to adjust the control parameter.

The control parameter may define operation of a target device. As indicated above, the target device may be any device capable of electronic control. For example, the target device may be used to provide entertainment, climate control, lighting, or any other service to the user. The target device may be a component of an audio system, a video component of a video system, a lighting control device, a thermostat that controls a heating and cooling system, a security system, or even another computing system. In this manner, the control parameter may be a volume control, a channel control, an input control, a light intensity control, a temperature control, a video camera directional control, or any other such parameter that at least partially defines the operation of the target device. The control parameter may thus be adjusted to a variety of values as desired by the user based on the position information 26 obtained from position devices 24.

Computing device 12 may adjust the control parameter by obtaining position information 26 from one or more position devices 24. In this manner, each of position devices 24 may have a distinct position that is representative of a magnitude of the control parameter with respect to a visual representation of the control parameter (e.g., a portion of visual media 22). For example, as the user moves computing device 12 to the right across visual media 22, each subsequent position device 24 may be used to increase the volume of a volume control parameter. As described herein, position information 26 may include coordinates of the respective position device 24 that remote server 18 uses to identify the position of each position device and the respective representative magnitude of the control parameter.

In addition, the control parameter may be at least partially adjusted based on the movement of computing device 12. Computing device 12 may utilize one or more sensors to detect movement of computing device 12 from a position device 24. Computing device 12 may then transmit the detected movement to remote server 18 such that remote server 18 may estimate the actual position of computing device 12 with respect to position device 24 and visual media 22. In other words, the detected movement of computing device 12 with respect to the most recently identified position device 24 may allow remote server 18 to resolve the position of computing device 12 with greater precision than may otherwise be possible with only position devices 24. Since there may be a gap between position devices 24, the exact position of computing device 12 between adjacent position devices may be difficult to determine. The detected movement may aid remote server 18 to better determine the position of computing device 12 and transmit supplemental information to computing device 12 based on this more accurate position.

In one example, computing device 12 may detect movement using accelerations of computing device 12. Computing device 12 may include one or more accelerometers (e.g., a single-axis, two-axis, or three-axis accelerometer) that measure accelerations of computing device 12 after computing device 12 obtains position information 26. Computing device 12 may measure the accelerations continually or only in response to obtaining position information 26. Computing device 12 may then calculate a distance and a direction that computing device 12 was moved from the last identified position device 24 based on the measured accelerations. The distance computing device 12 has moved may be calculated, for example, by double integrating the acceleration measurements over time.

In another example, computing device may detect movement of computing device 12 using optically obtained information. Computing device 12 may capture a plurality of images with an optical sensor (e.g., a camera) of computing device 12 as computing device 12 is moved with respect to visual media 22. The optical sensor may be disposed on or within the housing of computing device 12. For example, the optical sensor may be disposed opposite user interface 14 such that the optical sensor is facing visual media 22. As computing device 12 is moving, computing device 12 may begin capturing images in response to obtaining position information 26 from any position device 24. In some examples, computing device 12 may only capture images if computing device 12 detects movement. In other examples, computing device 12 may capture images in response to obtaining position information 26. Computing device 12 may recognize that movement is to be detected after obtaining position information 26. Alternatively, position information 26 may include a command that instructs computing device 12 to begin capturing images to detect movement. Computing device 12 may control the capturing of images using other techniques in other examples.

Computing device 12 may analyze changes between the captured images to determine the distance computing device moves in between obtaining position information 26 from position devices 24. In one example, computing device 12 may calculate the distance and the direction computing device 12 was moved from a position device 24 based on the rate and the direction that visual content of the visual representation (e.g., visual media 22) moved between the captured images. For example, computing device 12 may analyze consecutive images for similar structures. In some examples, the one or more similar structures may include a subtle pattern or lines, dots, or other shape printed on visual media 22. The subtle pattern may be relatively small or with minimal contrast to adjacent colors such that the subtle pattern is invisible or almost invisible to the human eye. The subtle pattern may have known dimensions or other features that facilitates determining the distance computing device 12 has moved (e.g., each subtle pattern is a known distance apart).

Computing device 12 may then determine the number of pixels between the similar structures of the consecutive images. Using a calibration equation or other algorithms to transform the number of pixels to a distance moved (e.g., multiplying the number of pixels by the calibrated width of each pixel), computing device 12 may calculate an estimation of the distance computing device 12 has moved with respect to the visual content captured by the images. When this calculation is done between each captured image, computing device 12 may add the calculated distances to get the total distance moved.

In addition computing device 12 may calculate a direction that computing device 12 has moved based on the how many pixels the structures in the images moved in two dimensions. This vector may indicate an angle with respect visual media 22. Over multiple images, computing device 12 may add the vectors of each change in the images to determine a resulting movement of computing device 12. This resulting movement, both direction and distance, may be transmitted by computing device 12 to remote sever 18 via network 16 such that remote server 18 can determine a more exact position of computing device 12 with respect to visual media 22.

Using any technique to determine the movement of computing device 12, subsequent detection of position devices 24 may be used to correct the estimation of computing device movement. For example, computing device 12 may obtain position information 26 a subsequent position device after obtaining position information 26 from a previous position device. Based on the known distance between the identified positions of the two position devices from the obtained position information 26, the detected movement of computing device 12 may be corrected. Although remote server 18 may correct the detected movement, computing device 12 may correct the detected movement in other examples.

As described herein, the visual representation of the control parameter may be similar to, or a part of, visual media 22. The visual representation of the control parameter may be mounted on a mounting surface comprising one or more position devices 24. The visual representation may be a visual indication of the control parameter to indicate to the user of computing device 12 that moving computing device 12 with respect to the visual representation can adjust the control parameter. The visual representation may take any form that is identifiable with the control parameter. For example, the visual representation may be a slider or a dial. In other examples, the visual representation of the control parameter may include a ramp, descriptive words (e.g., low and high), or even numerical indications of the control parameter magnitude. The visual representation may also be provided as printed media or an electronic display (e.g., a liquid crystal display, light emitting diodes, etc.).

In association with the visual representation, the one or more position devices 24 may be a subset of an array of position devices. The visual representation may be a part of a larger visual media 22 or be configured separately with its own array of position devices. Generally, position information 26 may include coordinates and/or a URL that indicates the position of each respective position device 24. In some examples, position information 26 may also have a code or other identifier that identifies the control parameter and the target device of which can be adjusted based on the position of computing device 12.

Since the target device may be controlled by remote server 18 based on the position of computing device 12 with respect to position devices 24, computing device 12 may not be able to interpret position information 26 to identify what adjustment will be made to the control parameter. Therefore, computing device 12 may receive the adjusted value of the control parameter from remote server 18. In other words, remote server 18 may transmit the adjusted value to computing device 12 via network 16 after the adjustment has been made or upon determining the adjusted value of the control parameter. Computing device 12 may also present the adjusted value of the control parameter using user interface 14. Therefore, the user of computing device 12 may receive feedback as to how the control parameter has changed based on the movement of computing device 12 with respect to visual media 22.

Various aspects of the disclosure may be operable only when the user has explicitly enabled such functionality. In addition, various aspects of the disclosure may be disabled by the user. Thus, a user may elect to prevent computing device 12 from transmitting position information 26 to remote server 18 or receive supplemental information directly from remote server 18. More generally, privacy controls may be applied to all aspects of the disclosure based on a user's privacy preferences to honor the user's privacy preferences for opting in or opting out of the functionality described in this disclosure.

Figure 2:
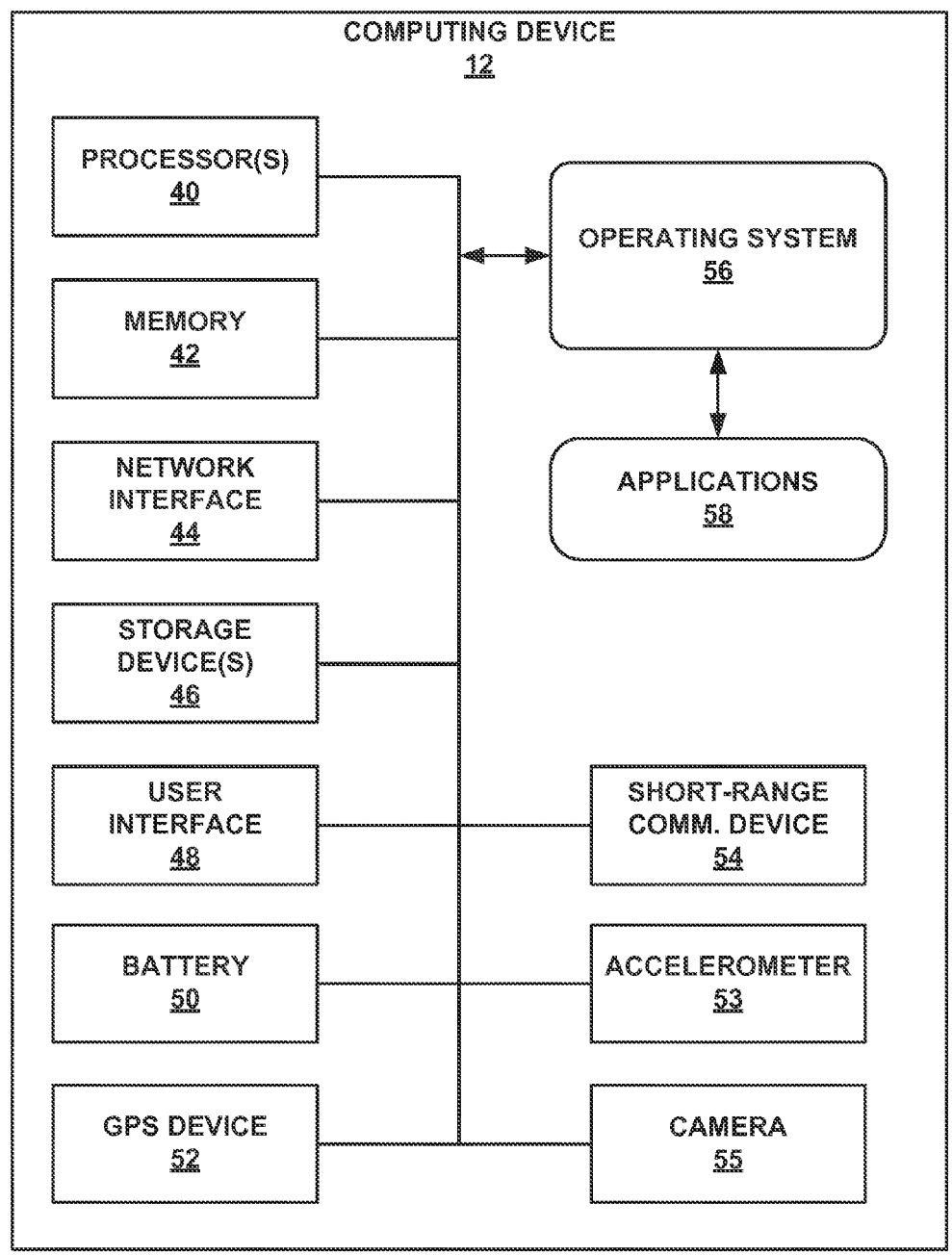
FIG. 2 is a block diagram illustrating components of one example of the computing device shown in FIG. 1, in accordance with one or more aspects of the present disclosure.

FIG. 2 is a block diagram illustrating components of example computing device 12 shown in FIG. 1. FIG. 2 illustrates only one particular example of computing device 12, and many other example embodiments of computing device 12 may be used in other instances. For example, computing device 12 may include additional components and run multiple different applications.

As shown in the specific example of FIG. 2, computing device 12 includes one or more processors 40, memory 42, a network interface 44, one or more storage devices 46, user interface 48, battery 50, GPS device 52, short-range communication device 54, accelerometer 53, and camera 55. Computing device 12 also includes an operating system 56, which may include modules and/or applications that are executable by processors 40 and computing device 12. Computing device 12, in one example, further includes one or more applications 58. One or more applications 58 are also executable by computing device 12. Each of components 40, 42, 44, 46, 48, 50, 52, 53, 54, 55, 56, and 58 may be interconnected (physically, communicatively, and/or operatively) for inter-component communications.

Processors 40, in one example, are configured to implement functionality and/or process instructions for execution within computing device 12. For example, processors 40 may be capable of processing instructions stored in memory 42 or instructions stored on storage devices 46. These instructions may define or otherwise control the operation of operating system 56 and applications 58.

Memory 42, in one example, is configured to store information within computing device 12 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 12 (e.g., one or more of applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 12, in some examples, also includes a network interface 44. Computing device 12, in one example, utilizes network interface 44 to communicate with external devices via one or more networks, such as network 16 in FIG. 1. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 12 utilizes network interface 44 to wirelessly communicate with an external device (not shown) such as a server, mobile phone, or other networked computing device.

Computing device 12, in one example, also includes one or more user interfaces 48. User interface 48 may be an example of user interface 14 described in FIG. 1. User interface 48 may be configured to receive input from a user (e.g., tactile, audio, or video feedback). User interface 48 may include a touch-sensitive and/or a presence-sensitive screen, mouse, a keyboard, a voice responsive system, or any other type of device for detecting a command from a user. In some examples, user interface 48 includes a touch-sensitive screen, mouse, keyboard, microphone, or camera.

User interface 48 may also include, combined or separate from input devices, output devices. In this manner, user interface 48 may be configured to provide output to a user using tactile, audio, or video stimuli. In one example, user interface 48 may include a touch-sensitive screen, sound card, a video graphics adapter card, or any other type of device for converting a signal into an appropriate form understandable to humans or machines. In addition, user interface 48 may include a speaker, a cathode ray tube (CRT) monitor, a liquid crystal display (LCD), or any other type of device that can generate intelligible output to a user.

Computing device 12, in some examples, include one or more batteries 50, which may be rechargeable and provide power to computing device 12. Battery 50, in some examples, is made from nickel-cadmium, lithium-ion, or other suitable material. In other examples, battery 50 may be a power source capable of providing stored power or voltage from another power source.

Computing device 12 may also include one of more GPS devices 52. GPS device 52 may include one or more satellite radios capable of determining the geographical location of computing device 12. Computing device 12 may utilize GPS device 52 to confirm the validity of visual media 22, for example. Alternatively, computing device 12 may transmit the GPS coordinates to remote server 18 to identify the location and the specific visual media 22.

In addition, computing device 12 may include one or more short-range communication device 54. For example, short-range communication device 54 may be an NFC device. As described herein, short-range communication device 54 may be active hardware that is configured to obtain location information from position devices 24. In general, short-range communication device 54 may be configured to communicate wirelessly with other devices in physical proximity to short-range communication device 54 (e.g., approximately 0-100 meters). In other examples, short-range communication device 54 may be replaced with an alternative short-range communication device configured to obtain position information 26 from respective position devices 24. These alternative short-range communication devices may operate according to Bluetooth, Ultra-Wideband radio, or other similar protocols.

Computing device 12 may also include various sensors. Computing device 12 may include one or more accelerometers 53 that senses accelerations of computing device 12. Accelerometer 53 may be a three-axis accelerometer that senses accelerations in multiple dimensions. Alternatively, accelerometer 53 may include two or more single-axis accelerometers. Computing device 12 may utilize accelerometer 53 to detect movement of computing device 12 and resolve the position of computing device 12 to a higher resolution than would be possible with position devices 24 alone. In some examples, computing device 12 may also include one or more gyroscopes to sense angular acceleration or compasses to sense the direction computing device 12.

Camera 55 may be an optical sensor that computing device 12 controls. Computing device 12 may capture images and/or video using camera 55. In some examples, camera 55 may be used to detect movement of computing device 12 with respect to visual media 22. Camera 55 may be located on any surface of computing device 12 in some examples. In other examples, computing device 12 may include two or more cameras.

Computing device 12 may include operating system 56. Operating system 56, in some examples, controls the operation of components of computing device 12. For example, operating system 56, in one example, facilitates the interaction of application 58 with processors 40, memory 42, network interface 44, storage device 46, user interface 48, battery 50, GPS device 52, short-range communication device 54, accelerometer 53, and camera 55.

Application 58 may be an application configured to manage obtaining position information 26, transmitting position information 26 to remote server 18, receiving supplemental information from remote server 18, and presenting the supplemental information on computing device 12. Application 58 may control one or more of these features. Application 58 may thus control any aspect of interaction visual media 22. Application 58 may be automatically launched upon detecting one of position devices 24 if application 58 is not already being executed by processors 40. Application 58 may also be used to measure and/or calculate the detected movement of computing device 12 or any other functionality described herein. Although one application 58 may manage supplemental information and the adjustment of a control parameter, separate applications may perform these functions in other examples. Although application 58 may be software independent from operating system 56, application 58 may be a sub-routine of operating system 56 in other examples.

Computing device 12 may utilize additional applications to manage any functionality described herein with respect to system 10 or other aspects of computing device 12. Any applications (e.g., application 58) implemented within or executed by computing device 12 may be implemented or contained within, operable by, executed by, and/or be operatively/communicatively coupled to components of computing device 12 (e.g., processors 40, memory 42, network interface 44, and/or storage devices 46).

Figure 3:
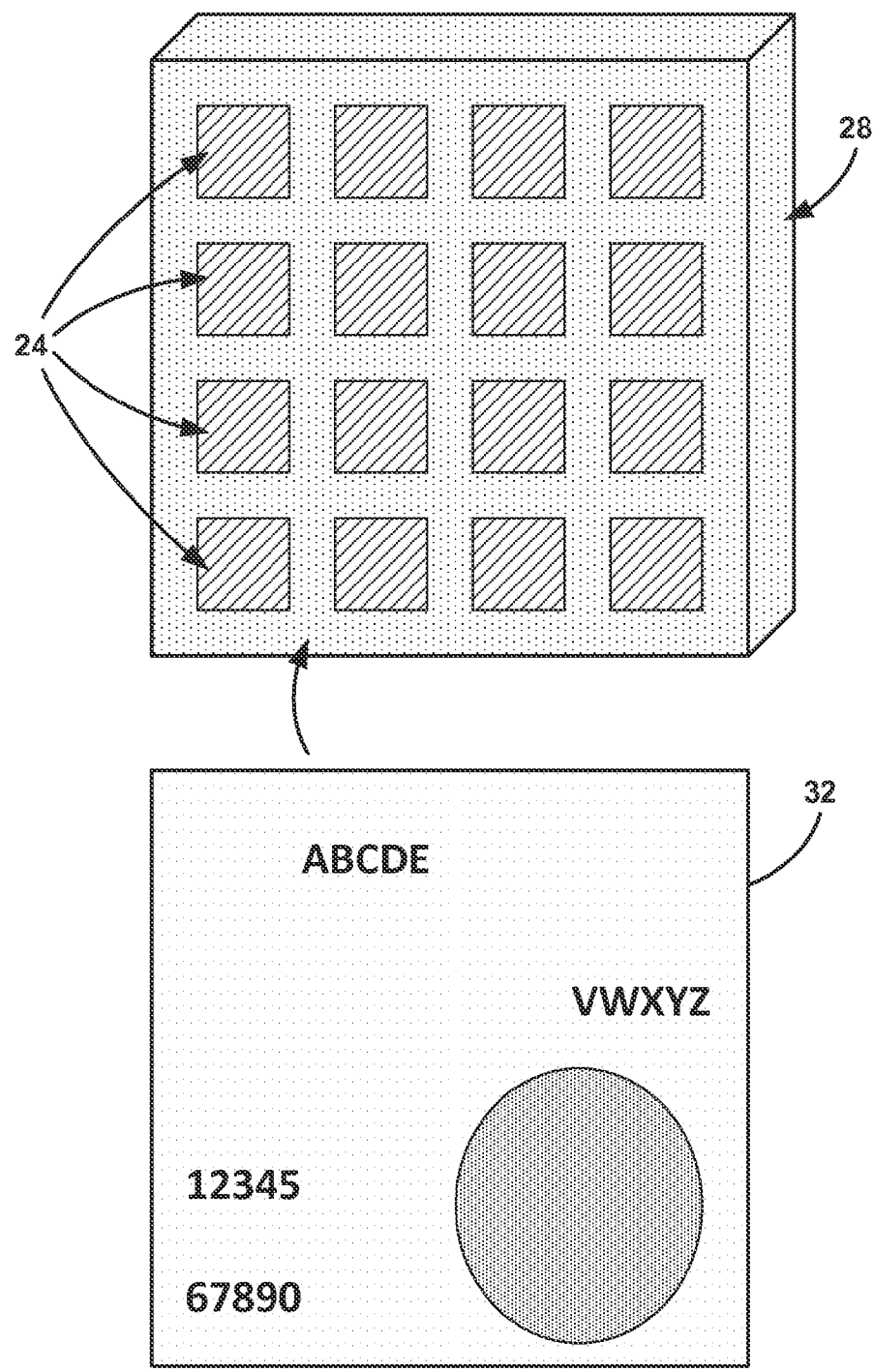
FIG. 3 is a conceptual diagram illustrating an example visual media and associated array of position devices.

FIG. 3 is a conceptual diagram illustrating an example visual media 32 and associated array of position devices 24. As shown in FIG. 3, visual media 32 provides various graphical objects, words, and/or numbers arranged for a particular purpose. Visual media 32 is an example of visual media 22 described in FIG. 1. Visual media 32 may be a printed media (e.g., paper, cardboard, or other medium with stationary markings) or an electronic display (e.g., an LCD, LED, or other dynamically changing medium). Although a printed media may be provided as a less expensive alternative, an electronic display may be appropriate in some applications.

Position devices 24 may be attached to mounting surface 28. Mounting surface 28 may be constructed of any material capable of retaining position devices 24. If position devices 24 are adhesive tags, mounting surface 28 may be a sheet of paper, cardboard, or other material. In some examples, mounting surface 28 may be constructed of a polymer, wood, composite, or other rigid material. Mounting surface 28 may be constructed such that mounting surface 28 may be attachable to an exterior wall, an interior wall, a window, or any other surface. Mounting surface 28 may be constructed with a substantially planar surface or cavities each configured to accept one of position devices 24. In some examples, cavities of mounting surface 28 may be located on a side of mounting surface 28 opposite the side to which visual media 32 is attached. Alternatively, the cavities for each position device may have a depth such that when each position device is disposed within its respective cavity a substantially planar surface is created to which visual media 32 can be attached.

Position devices 24 may be arranged in an array of various sizes and shapes as needed for visual media 32. Typically, position devices 24 may be arranged in a rectangular or square array to provide proper coverage for visual media 32. For example, position devices 24 are arranged in a 4 by 4 grid in mounting surface 28. In other examples, fewer or greater numbers of position devices may be provided (e.g., as few as one position device, hundreds of position devices, or more than a thousand position devices). Position devices 24 may be mounted edge-to-edge to limit any gaps between adjacent position devices. Alternatively, a gap may be provided between position devices 24 to limit the number of position devices 24 needed to provide adequate coverage of mounting surface 28. Computing device 12 may determine the movement between each position device when fewer position devices are provided for visual media 32.

Visual media 32 may be constructed to be placed on top of, or cover, position devices 24 and mounting surface 28. Mounting surface 28 may include attachment structures, a transparent cover, or some other mechanism that attaches visual media 32 to mounting surface 28. Alternatively, visual media 32 may be attached to mounting surface 28 with an adhesive. Generally, mounting surface 28 is constructed such that different visual media can be used with mounting surface 28 and position devices 24 over time. In other words, one visual media may be replaced with other visual media as desired. This process may reduce the cost of providing position devices 24 because only visual media 32 must be replaced. Although visual media 32 may cover the entire area of mounting surface 28, visual media 32 may be configured to only cover a portion of mounting surface 28 and a subset of position devices 24.

Either a printed media or electronic display may be mapped to position devices 24. Once visual media 32 is generated, any portions of visual media 32 with supplemental information are mapped to the position of each respective position device 24. Remote server 18 may perform the mapping function and store the map within remote database 20. Therefore, anytime remote server 18 receives position information 26 from one of position devices 24, remote server 18 can retrieve the specific portion of visual media 32 and the associated supplemental information from remote database 20. An electronic display may allow two or more visual media to be displayed at various times. In this example, remote server 18 may obtain information as to which visual media was displayed when position information 26 was obtained by computing device 12. Remote server 18 may retrieve this information from a pre-determined schedule for displaying the multiple visual media or directly from a controller that determines which visual media is displayed by the electronic display.

The initial registration or mapping of position devices 24 to portions of visual media 32 may be performed by an administrator or user of the service that utilizes remote server 18. For example, the user may upload an electronic version of visual media 32 to remote server 18. Remote server 18 may create regions over each portion of visual media 32 (e.g., coordinates or coordinate bounded regions) that would correspond to respective position devices 24. Visual media 32 may thus be mapped to position devices 24. Remote server 18 may present these regions as a grid or other feature over visual media 32 to the user on a computing device. The user may then interact with the computing device and remote server 18 to select each region (e.g., a hot spot) within visual media 32 that will be associated with supplemental information. The administrator or user may then associate supplemental information with the selected regions, and corresponding portions, of visual media 32 mapped to one or more position devices 24. In this manner, the mapping may be automated and the associations may require user input. Remote server 18 may then store the mapping and associations in remote database 20 (e.g., a cloud storage device) for later retrieval in response to receiving the appropriate position information.

In other examples, a user or administrator may map position devices 24 to portions of visual media 32 in a less computationally intensive process. For example, remote server 18 may present the layout or grid of position devices 24 and their dimensions. The user may then manually determine which position device should be mapped to which portions of visual media 32. The user may then upload or assign the desired supplemental information for each of the position devices 24. Remote server 18 may thus map one or more position devices 24 to various portions of visual media via input from the user. Other techniques for mapping portions of visual media 32 to position devices 24 and associating position devices 24 to supplemental information may also be used.

Figure 4:
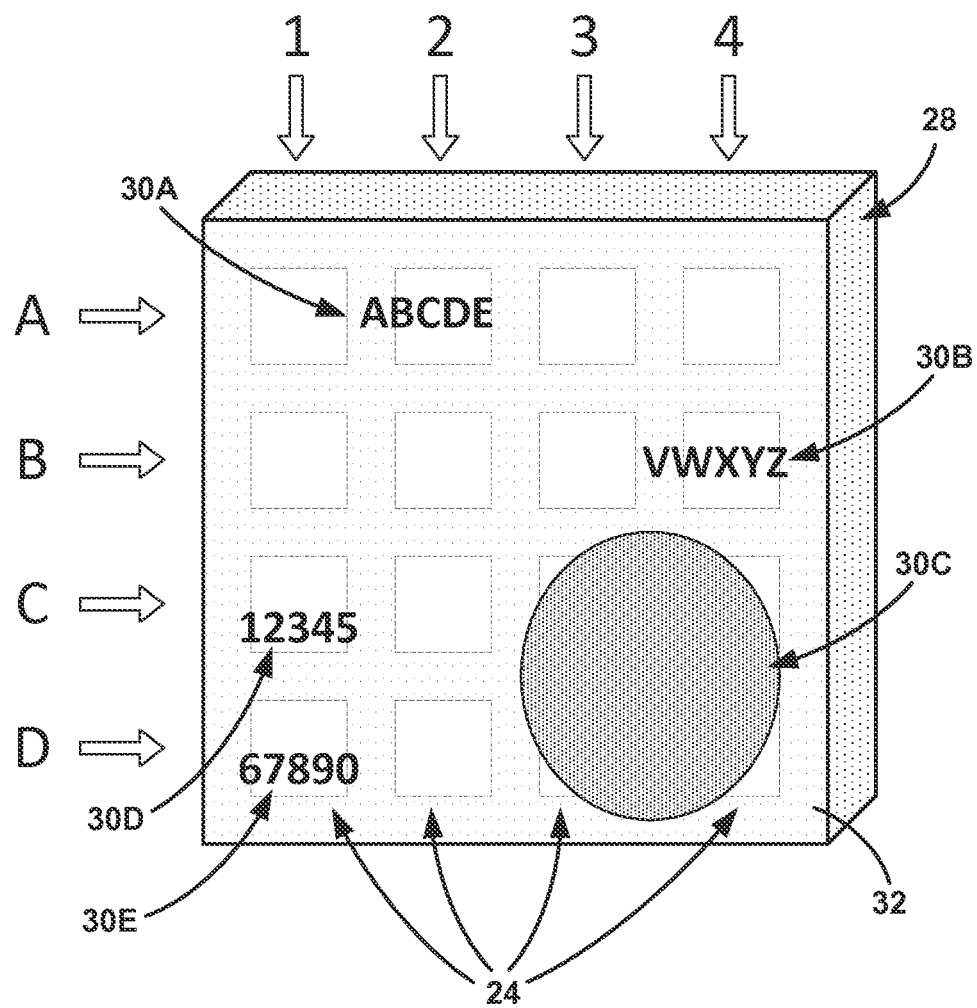
FIG. 4 is a conceptual diagram illustrating an example visual media mounted on a mounting surface including an array of position devices.

FIG. 4 is a conceptual diagram illustrating an example visual media 22 mounted on mounting surface 28 including an array of position devices 24. As shown in FIG. 4, visual media 32 is mounted to mounting surface 28. Position devices 24 are illustrated with dotted lines to indicate that position devices 24 are located behind visual media 32. In other words, the user of computing device 12 may view visual media 32 without knowing that position devices 24 are even located behind visual media 32. The user may interact with visual media 32 without requiring any knowledge about any position devices 24, or the located of position devices 24, in relation to visual media 32.

Position devices 24 may be identified by coordinates stored by each respective position device, as described herein. For purposes of illustration in FIG. 4, each of position devices 24 are identified by a column and row identifier. Each column is identified by a unique number (e.g., 1, 2, 3, and 4), and each row is identified by a unique letter (e.g., A, B, C, and D). For example, the upper left position device may be identified as A1, and the lower right position device may be identified as D4. In other examples, the coordinates may use only numbers (e.g., the first number of the coordinate indicates the row and the second number indicates the column), only letters, or some other indication of where each position device is located on mounting device 28.

Visual media 32 may include multiple portions to which supplemental information may be associated. Therefore, these portions, or even the entire visual media 32, may be mapped to respective position devices 24. Visual media 32 may include portions 30A, 30B, 30C, 30D, and 30E (collectively "portions 30"). For example, portion 30A provides the letters "ABCDE." Portion 30A would be mapped to position device A2 because position device A2 is the closest position device 24 to portion 30A. Likewise, portion 30B may be mapped to position device B4, portion 30D may be mapped to position device C1, and portion 30E may be mapped to position device D1. In each of portions 30A, 30B, 30D, and 30E, only one position device 24 may be mapped to each portion.

However, two or more position devices 24 may be mapped to a single portion of visual media 32. For example, portion 30C may be a relatively large graphic (shown as an oval in portion 30C) provided by visual media 32. Since portion 30C covers at least a portion of four different position devices, portion 30C may be mapped to each of these different position devices. Therefore, portion 30C may be mapped to position devices C3, C4, D3, and D4. If computing device 12 obtains position information from any of position devices C3, C4, D3, or D4, remote server 18 may transmit supplemental information associated to portion 30C back to computing device 12. In this manner, supplemental information may be mapped to a portion of visual media 32 that covers, or is otherwise associated with, one or more position device 24.

As described herein, supplemental information may be retrieved by computing device 12 as long as position information is obtained from at least one position device 24 mapped to the intended portion of visual media 32. For example, if computing device 12 obtains position information identifying position device C1 and transmits that position information to remote server 18, remote server 18 may transmit supplemental information associated with portion 30D (i.e., "12345") to computing device 12. In other examples, computing device 12 may need to obtain position information from multiple position devices 24 before supplemental information can be retrieved. In other words, remote server 18 may require position information from two or more position devices 24 before remote server 18 may transmit the supplemental information to computing device 12. The multiple position devices may be used to identify overlapping portions of visual media 32 or otherwise prevent supplemental information from being obtained when computing device 12 is only located at a periphery of the intended portion. For example, computing device 12 may need to obtain position information from position devices C3 and C4 (or any other combination of mapped position devices 24 to portion 30C) before supplemental information associated with portion 30C will be retrieved from remote sever 18.

By using a coordinate system like the one described in FIG. 4, each of position devices 24 may be readily identifiable by location within mounting surface 28 and with respect to visual media 32. In other examples, a coordinate system may not be necessary to map each of position devices 24 to a portion of visual media 32. For example, each of position devices 24 may be referred to with a unique identifier that can be mapped to a segment of mounting surface 28. In any example, each unique position device 24 may be capable of being mapped to a portion of mounting surface 28 and/or visual media 32.

Portions 30 provided in FIG. 4 are merely examples of media that may be placed at various locations of visual media 32. Instead of "ABCDE" and "12345" for example, visual media may include various words, sentences, text, pictures, or other images selected for a specific purpose. For example, visual media 32 may be selected and designed as an advertisement, an informational display, a map, or any other media that may benefit from an interactive capability provided by position devices 24.

Figure 5:
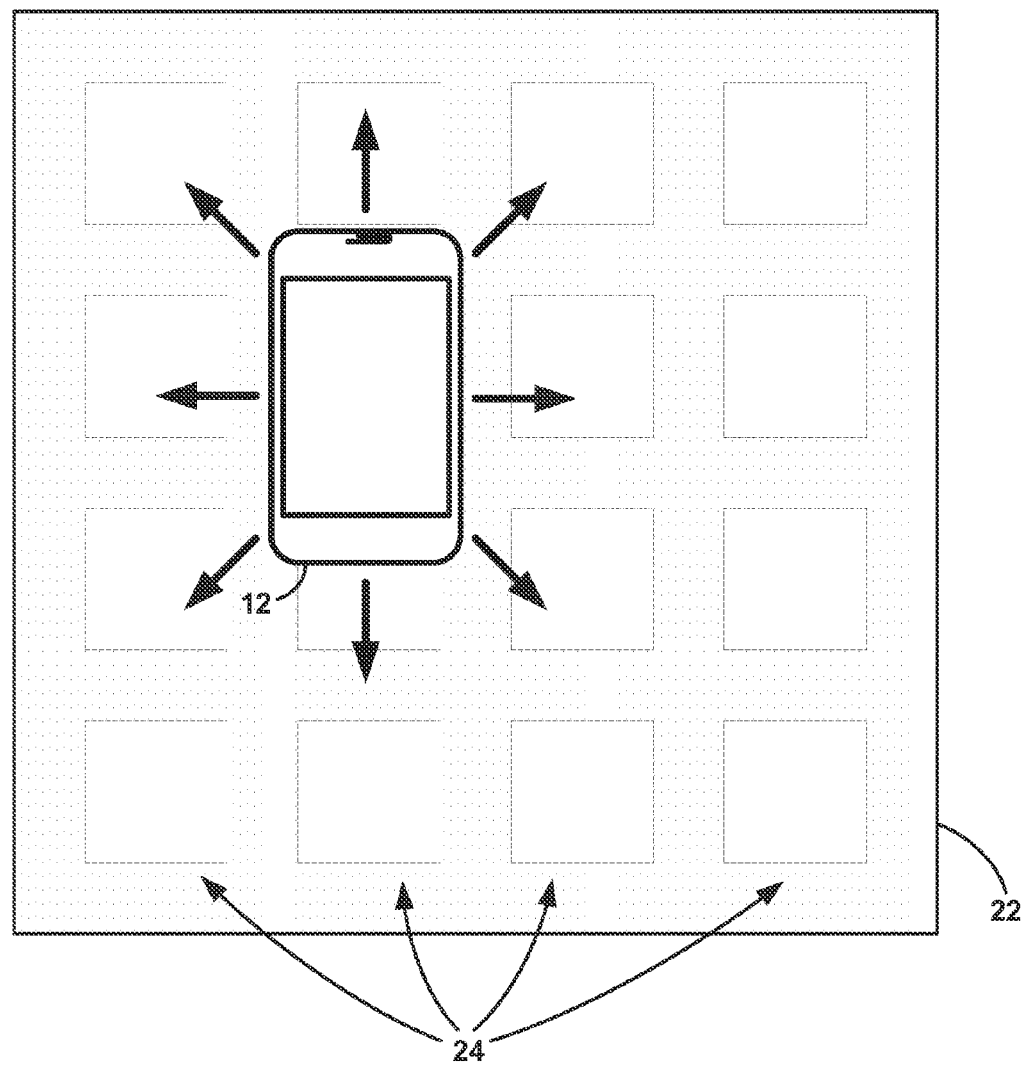
FIG. 5 is a conceptual diagram illustrating an example computing device in conjunction with visual media.

FIG. 5 is a conceptual diagram illustrating computing device 12 in conjunction with visual media 22. As shown in FIG. 5, computing device 12 may be moved by a user with respect to visual media 22 and the one or more position devices 24 provided behind visual media 22. The user may move or slide computing device 12 along the surface of visual media 22 to the desired portion of visual media 22. Computing device 12 may thus travel between two or more position devices 24 arranged behind the surface of visual media 22. In this manner, the user may move computing device 12 in any direction as indicated by the example arrows of FIG. 5, and these directions may not need to follow any arrangement of position devices 24. Indeed, the user of computing device 12 may be able to detect or notice any position devices 24.

Computing device 12 may be moved over visual media 22 from a location beyond a peripheral edge of visual media 22. Alternatively, computing device 12 may be moved from a distance far from the surface of visual media 22 to a close distance to the surface of visual media 22. In either example, computing device 12 may be moved to a location in close proximity to the desired portion of visual media 22 in any desired movement by the user.

Generally, computing device 12 may be moved across or along the surface of visual media 22, such as generally within a single plane to obtain supplemental information associated with portions of visual media 22. In other words, computing device 12 may obtain position information from position devices 24 only when computing device 12 within a communication range of the position devices 24. The communication range for position devices 24 and computing device 12 (e.g., the distance needed for communication) may be dependent, at least in part, on the size and/or diameter of the antenna coil within computing device 12. In this manner, computing device 12 may obtain position information 26 at longer distances from a position device with larger antenna dimensions.

Generally, computing device 12 may obtain position information when computing device is within a range of between approximately 1.0 centimeters and 100 centimeters from visual media 22. In one example, computing device 12 may need to be within approximately centimeters of position devices 24. In other examples, computing device 12 may need to be within a distance between approximately 1.0 centimeters and 5.0 centimeters. In one example, computing device 12 may need to be within a distance of approximately 2.5 centimeters. However, computing device 12 may need to be placed relatively close to visual media 22 such that computing device 12 does not obtain position information from multiple position devices 24 at the same time. The user may thus keep computing device 12 relatively close to visual media 22 to obtain position information from position devices 24 and related supplemental information associated with the various portions of visual media 22.

Figure 6:
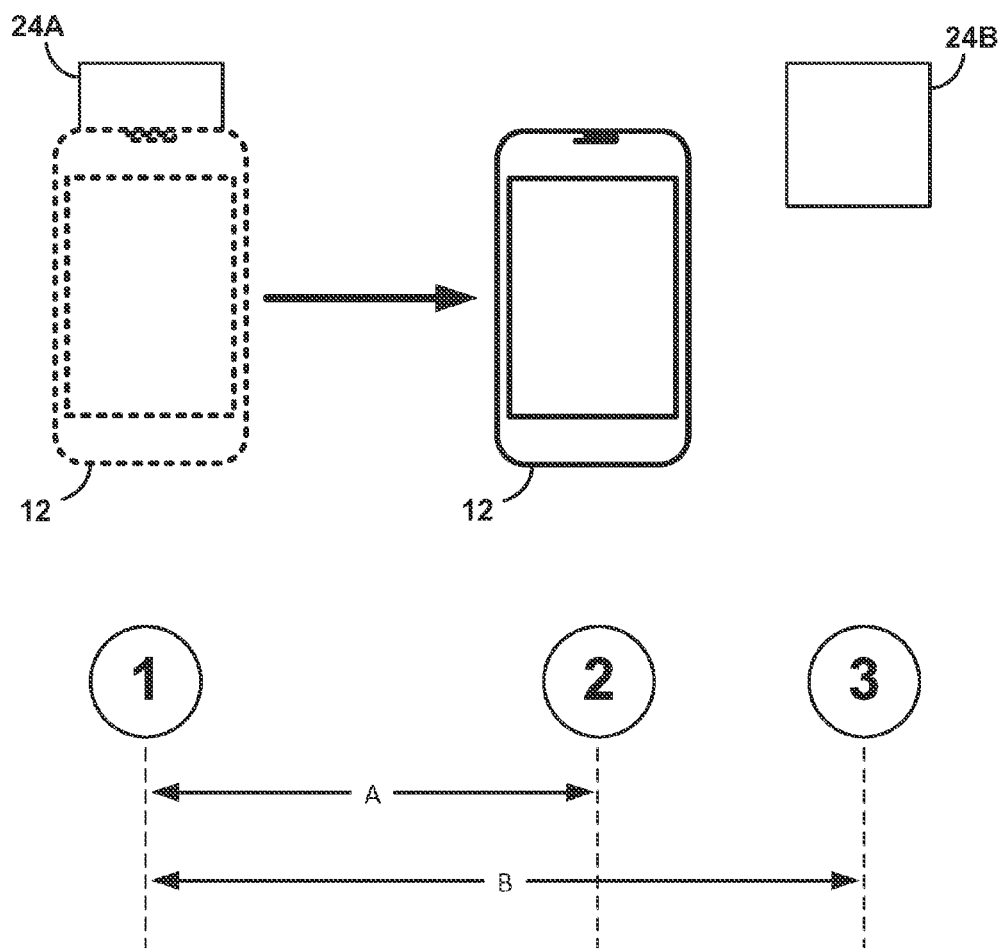
FIG. 6 is a conceptual diagram illustrating movement of an example computing device between two position devices.

FIG. 6 is a conceptual diagram illustrating movement of computing device 12 between two position devices (e.g., position devices 24A and 24B). As shown in FIG. 6, computing device 12 may be moved between two different position devices 24. This movement may occur as a user desires to move computing device 12 across visual media 22 or to one or more desired portions of visual media 22. As described herein, computing device 12 identifies its position with respect to visual media 22 by obtaining position information from a position device such as position device 24A. The position of computing device 12 at location 1 is thus determined from the obtained position information (e.g., the known position of position device 24A. However, without additional information, neither computing device 12 nor remote server 18 may be able to determine the location 2 of computing device 12 during movement of computing device 12 until subsequent position information is obtained from another position device (e.g., position device 24B at location 3). Computing device 12 may thus use one or more sensors to determine a higher resolution location during movement of computing device 12.

Computing device 12 may thus be capable of determining, or estimating, the distance A between location 1 and location 2. Distance A is less than distance B between position device 24A and position device 24B. Distance A may be determined at any point in time and may be updated as computing device 12 is moved with respect to location 1. By determining distance A from the previous position device (e.g., position device 24A), computing device 12 and/or remote device 18 may be able to identify the location of computing device 12 with respect to position devices 24 and visual media 22 with higher resolution or more accuracy than would otherwise be possible by only obtaining position information from position devices 24.

Although distance A between locations 1 and 2 of FIG. 6 may be a horizontal distance between position devices 24A and 24B, distance A may be in any direction from position device 24A. For example, computing device 12 may be moved in a diagonal direction or vertical direction with respect to position device 24A and distance A may still be measured in accordance to the direction in which computing device 12 has moved. Therefore, the movement detected by computing device 12 may have a direction component and a magnitude component. In other words, computing device 12 may be able to determine the approximate location of computing device 12 with respect to position devices 24 when computing device 12 is moved in any direction.

Computing device 12 may begin sensing and determining movement in response to obtaining position information from a position device (e.g., position device 24A). Alternatively, computing device 12 may continuously sense and determine movement before and after obtaining position information. However, computing device 12 may only utilize the movement detected after obtaining the position information to update the location of computing device 12 due to movement subsequent to being proximate to the previous position device. In other examples, computing device 12 may change the detection rate (e.g., the rate of the sensor that senses the movement) in response to obtaining position information or after a predetermined period of time after obtaining the position information. For example, computing device 12 may increase the detection rate from a low detection to a high detection rate to provide a more accurate estimation of the position of computing device 12.

In either case, the detected movement of computing device 12 may be used when new position information is not available during movement of computing device 12. For example, position devices 24 may be separated by some distance on the mounting surface. When computing device 12 is positioned within this gap between position devices, the detected movement may provide a useful estimation of the location of computing device 12. As computing device 12 is moved over a greater distance, the estimation of computing device 12 position may become less accurate based on the detected movement. For this example reason, the exact location of computing device 12 may be updated, or corrected, upon obtaining new position information from a subsequent position device.

In other words, position information obtained from a position device may override the location estimated by the detected movement.

Estimating computing device 12 locations with detected movement may be employed to reduce the number of position devices needed for a mounting surface and visual media. Although position devices may be arranged in a dense array or pattern, less dense arrays of position devices may reduce the cost of mounting surfaces or be more practical for visual media covering large areas. For example, the distance between position devices may be between approximately 0.5 centimeters and 100 centimeter. More specifically, the distance between position devices may be between approximately 1.0 centimeters and 10 centimeters. In one alternative, a mounting surface may only include one position device. The position device may be positioned in a corner or the middle of the mounting surface, for example. Once computing device 12 obtains position information from the single position device, the location of computing device 12 with respect to the single position device, and the associated visual media, may be fully estimated based on the detected movement of computing device 12. In this manner, multiple portions of a visual medium may be mapped to a single position device or many position devices.

As described herein, computing device 12 may use a sensor within computing device 12 to detect movement of computing device 12 from a previous position device 24. Computing device 12 may then transmit the detected movement to a networked device (e.g., remote server 18). In one example, computing device 12 may include one or more accelerometers (e.g., accelerometer 53 of FIG. 2) that detect movement of computing device 12 by measuring accelerations of computing device 12 after obtaining the position information from a position device. After the accelerations are measured, computing device 12 may calculate a distance and a direction that computing device 12 was moved from the previous position device based on the measured accelerations. The accelerations may be measured with a two or three axis accelerometer or multiple accelerometers arranged orthogonally to each other. This acceleration measurement method may be referred to as an inertial measurement to interpolate the distance from a position device.

The measured accelerations (e.g., sensor values obtained from the accelerometer sensor) may be used to measure the moved distance by double integrating the measured accelerations, for example. The distance may thus be calculated periodically and added to previously measured distances or calculated at a single time determined based on stopped movement or some other detected indication that the distance should be calculated. For example, the new position of computing device 12 may be determined in two dimensions in a plane parallel with the visual media. The following equation may be used to determine the new position of computing device 12:

$$\text{Position}(NewX, NewY) = \text{Position}(OldX + \text{Integral}(\text{Integral}(AccX, t), t), OldY + \text{Integral}(\text{Integral}(AccY, t), t)). \quad (1)$$

Equation 1 illustrates the example method for determining the new position of computing device 12 by double integration of each X and Y directional component of the sensor output. NewX is the new position in the X direction and NewY is the new position in the Y direction. Similarly, OldX is the previous position in the X direction and OldY is the previous position in the Y direction. AccX is the acceleration value in the X direction over time t and AccY is the acceleration value in the Y direction over time t. When each acceleration value is integrated twice and added to the previous, or old, position, the detected movement has been used to calculate or estimate the location of computing device 12. The difference between the old position and the new position may be the distance A between locations 1 and 2 of FIG. 6.

In some examples, computing device 12 may directly calculate the new position of computing device 12 and transmit the new position to remote server 18 to obtain new supplemental information. In other examples, computing device 12 may calculate the distance and direction computing device 12 has moved, and may transmit the distance and direction information to remote server 18. Remote server 18 may then apply the transmitted information to the location of the previous position device and calculate the new position of computing device 12. In this manner, computing device 12 and remote server 18 may each contribute to calculating the movement of computing device 12. Alternatively, remote sever 18 may perform most of the calculations to determine new position of computing device 12. Computing device 12 may simply transmit sensed values from the one or more accelerometers, and calibration information if necessary, to remote server 18. Remote server 18 may then calculate the distance and direction computing device 12 has moved and the new position of computing device 12. In any case, remote server 18 may use the newly calculated position of computing device 12 to transmit supplemental information to computing device 12 when the position of computing device 12 correlates to a portion of visual media associated with the supplemental information.

In other examples, the movement of computing device 12 may be determined using alternative methods and/or different types of sensors. For example, computing device 12 may determine movement with an optical sensor (e.g., a sensor of camera 55 of FIG. 2). Computing device 12 may capture a plurality of images with a sensor of computing device 12 and calculate a distance and a direction computing device 12 was moved from the position device based on a distance and a direction that visual content of the visual representation moved between the captured plurality of images. In other words, computing device 12 may still calculate movement similar to using accelerations. However, the data being used may be differences between subsequent images taken during the movement of computing device 12.

When computing device 12 is held in close proximity to visual media 22 (e.g., within a distance that computing device 12 can obtain position information from position devices), a camera facing visual media 22 may capture two or more images of visual media 22 as computing device 12 is moved with respect to visual media 22. Computing device 12 may analyze the visual content of visual media 22 from each image to identify similar structures or content (e.g., a letter or a portion of an image) in each image. Because computing device 12 was moving between each captured image, the distance and direction between similar structures may correspond to the distance and direction that computing device 12 moved during the time between each image was captured.

Computing device 12 may count the number of pixels in an X direction and the number of pixels in the Y direction between the similar structures of each image. Computing device 12 may then multiply the number of pixels by an image distance calibrated based on the width or height of each pixel and the approximated distance between the camera and visual media 22. Computing device 12, and or remote server 18, may then apply the updated X and Y distances to the previously known position of computing device 12. The X and Y distances may be directly added as components to position components of computing device 12 or a vector may be calculated for the new X and Y distances to establish the distance and direction that computing device 12 moved from the previous position.

Using any method described herein, the detected movement of computing device 12 may be used to estimate the location, or position, of computing device 12 as computing device moves from location 1 and position device 24A to location 2 a distance A from position device 24A. The calculated distance A may be referred to as an estimation because of the indirect sensing techniques that may be employed to detect the movement of computing device 12. In this manner, the actual distance B between position device 24A and position device 24B may not be identical to the calculated distance A during the movement between the position devices. Therefore, remote server 18 may use the obtained position information from position device 24B to correct the position of computing device 12 any time new position information is obtained.

Figure 7:
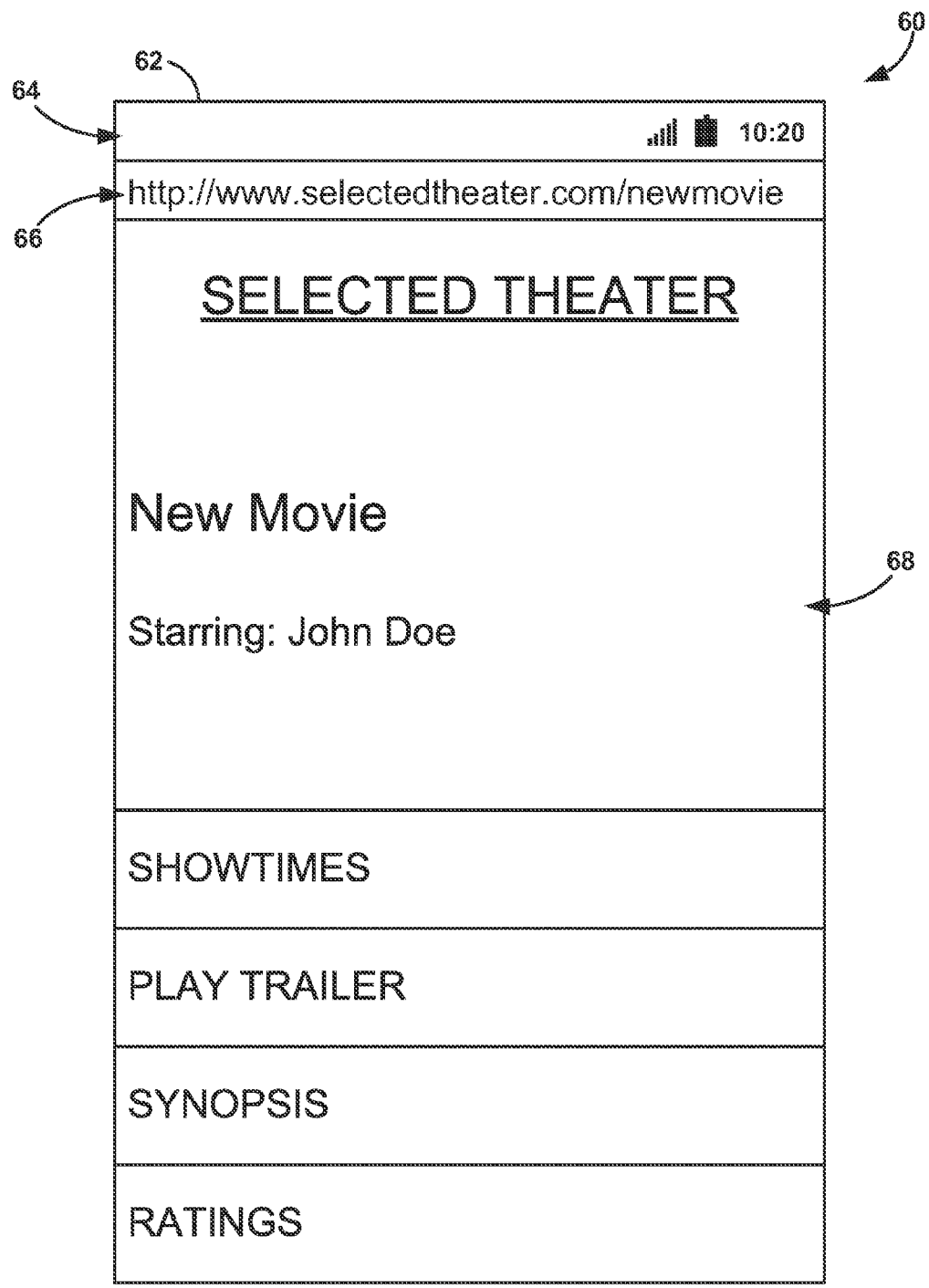
FIG. 7 is an illustration of an example user interface containing supplemental information received based on position information obtained from a position device.

FIG. 7 is an illustration of an example user interface 60 containing supplemental information 68 received based on position information obtained from a position device. User interface 60 is an example of user interface 14. As shown in FIG. 7, user interface 60 presents screen 62 to the user via computing device 12. Screen 62 includes status bar 64, address bar 66, and supplemental information 68. Screen 62 may be an example screen within application 58 of FIG. 2 (e.g., an application for providing supplemental information) running on computing device 12. For example, screen 62 may be a web browser that returns a website according to an address provided in the supplemental information.

Status bar 64 may include one or more icons that indicate the status of computing device 12 and/or applications running on computing device 12. For example, status bar 64 may present a time of day, battery charge level, network signal strength, application updates, received messages, or even notification that position information has been received from a position device 24. Address bar 66 may indicate to the user what the web address is for supplemental information 68 shown in screen 62. In response to receiving the position information from computing device 12, remote server 18 may transmit supplemental information for the associated portion of visual media in the form of a web address. Computing device 12 may thus use the web address of the supplemental information to retrieve additional supplemental information related to the portion of visual media of interest to the user of computing device 12.

In the example of FIG. 7, screen 62 provides supplemental information 68 that may be associated to a portion of visual media that is an advertisement for a movie. The visual media may map the portion specific to a certain movie to one or more position devices. Supplemental information 68 may include information such as the theater associated with the visual media, the movie name (e.g., New Movie), and actors starring in the movie. In addition, supplemental information 68 may provide links to more information if desired by the user. For example, supplemental information 68 may provide links (or include the information) for showtimes, a synopsis of the movie, ratings for the movie, or even a video trailer for the movie. In addition, supplemental information 68 may include a mechanism so that the user of computing device 12 can purchase tickets to the movie. In this manner, supplemental information 68 may include any type of information, or links to any type of information, related to a portion of the visual media.

In other examples, supplemental information 68 may be selected for any other type of information provided by visual media 22. For example, supplemental information 68 may include price information, coupons, schedules, videos, pictures, audio information, interactive games, comment forums, or any other type of information. Supplemental information 68 may be provided by a web browser, an application specific to obtaining the position information, or any other software and hardware combination of computing device 12. Therefore, supplemental information 68 may be a small piece of information, a large amount of information within which the user may navigate, and/or a link to additional supplemental information. In any case, remote server 18 may transmit at least a portion of the supplemental information to computing device 12 via network 16 in response to the position information received from computing device 12.

Screen 62 may also be formatted to facilitate use in a touch screen user interface 60. In other words, all of the user inputs may be large enough for a user to touch with a single finger. Alternatively, screen 62 may be formatted to include smaller user inputs when a pointing device may be used to select input buttons.

Figure 8:
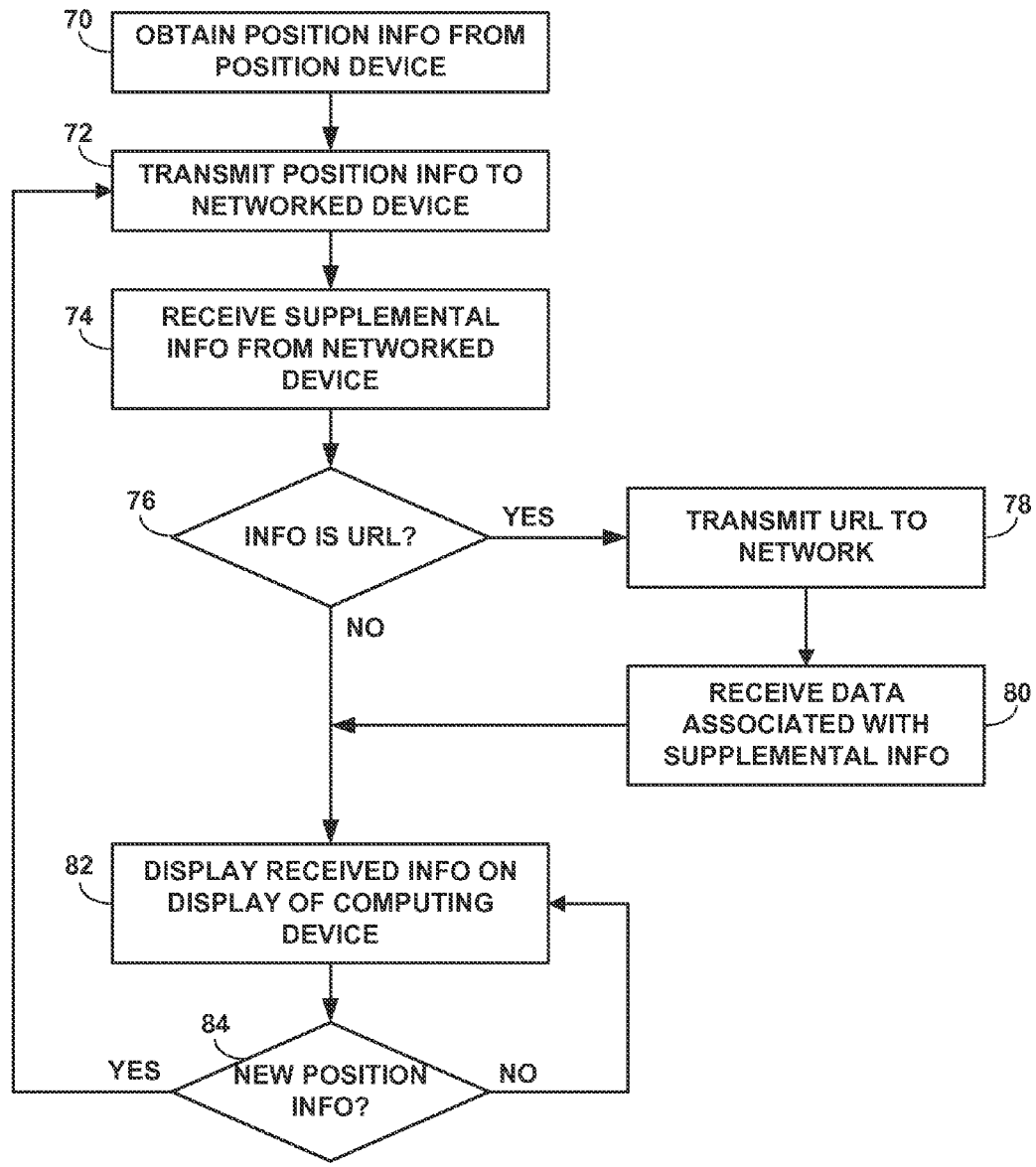
FIG. 8 is a flow diagram illustrating an example process that may be performed by a computing device to receive supplemental information based on position information obtained from a position device associated with visual media.

FIG. 8 is a flow diagram illustrating an example process that may be performed by a computing device (e.g., computing device 12) to receive supplemental information based on position information (e.g., position information 26) obtained from a position device (e.g., position device 24) associated with visual media (e.g., visual media 22). The process of FIG. 8 will be described below with respect to processor 40, but other processors, modules, applications, or any combination thereof, may perform the acts attributed to processor 40. Using short-range communication device 54 (e.g., an NFC device), processor 40 may obtain position information 26 from a position device 24 when computing device 12 is placed proximate to visual media 22 (70).

Once processor 40 obtains position information 26, processor 40 may transmit position information 26 to a network device such as remote server 18 via network 16 (72). Processor 40 may utilize network interface 44 to transmit position information 26. In response, processor 40 may receive supplemental information from remote server 18 via network 16 and network interface 44 (74). The transmitting of position information 26 and the receiving of supplemental information may occur automatically without any input from the user of computing device 12. Alternatively, the user may need to provide input that allows computing device 12 to transmit the position information and/or allows computing device 12 to receive the supplemental information.

If the received supplemental information is in the form of a URL ("YES" branch of block 76), processor 40 may transmit the URL to network 16 using a web browser or other application (78). Processor 40 may then receive data associated with the supplemental information (e.g., more supplemental information) via network 16 (80). Processor 40 then displays the received supplemental information to the user using user interface 14 of computing device 12 (82). If the received supplemental information is not in the form of a URL (e.g., the supplemental information is ready for user viewing) ("NO" branch of block 76), processor 40 displays the received supplemental information to the user using user interface 14 of computing device 12 (82).

As long as processor 40 does not obtain new position information ("NO" branch of block 84), processor 40 may continue to display the supplemental information. If new position information is obtained by processor 40 ("YES" branch of block 84), processor 40 may transmit the new position information to remote server 18 (72) to retrieve new supplemental information. Although new supplemental information may be presented to the user via user interface 14, the user may be able to navigate among all supplemental information once it is received from remote server 18.

Figure 9:
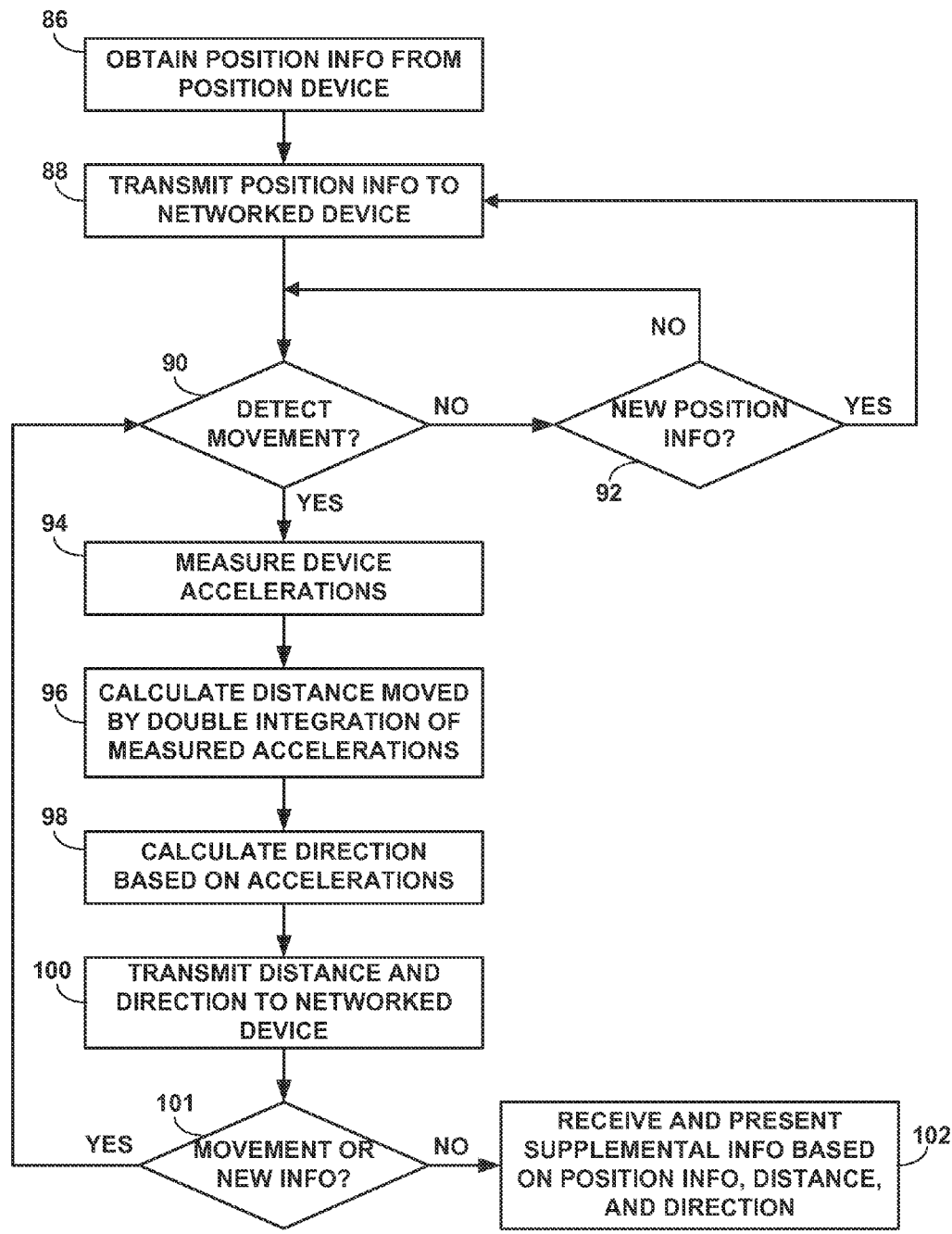
FIG. 9 is a flow diagram illustrating an example process that may be performed by a computing device to resolve a position of the computing device between two position devices.

FIG. 9 is a flow diagram illustrating an example process that may be performed by a computing device (e.g., computing device 12) to resolve a position of the computing device between two position devices (e.g., position devices 24). The process of FIG. 8 will be described below with respect to processor 40, but other processors, modules, applications, or any combination thereof, may perform the acts attributed to processor 40. Although the movement detection described in FIG. 9 is described with regard to accelerometer 53, other sensors such as camera 55 may be used instead to calculate the distance and direction computing device 12 has moved with respect to visual media 22.

Using short-range communication device 54 (e.g., an NFC device), processor 40 may obtain position information 26 from a position device 24 when computing device 12 is placed proximate to visual media 22 (86). Once processor 40 obtains position information 26, processor 40 may transmit position information 26 to a network device such as remote server 18 via network 16 (88). If processor 40 does not detect any movement of computing device 12 via accelerometer 53 ("NO" branch of block 90), processor 40 may determine if any new position information has been obtained (92). If new position information has been obtained ("YES" branch of block 92), processor 40 may transmit the new position information to remote server 18 (88). If no new position information is obtained, processor 40 may continue to detect movement of computing device 12 (90).

If processor 40 detects movement of computing device 12 based on a change in output from accelerometer 53 ("YES" branch of block 90), processor 40 may measure accelerations of computing device 12 (94). Processor 40 may command accelerometer 53 to being sensing accelerations or processor 40 may begin accessing accelerometer data to measure the accelerations. Using the acceleration values, processor 40 may calculate the distance computing device 12 has moved by double integrating the measured accelerations (96). Processor 40 may also calculate the direction computing device 12 has moved by determining the vector based on direction components of the distance values (98). Alternatively, processor 40 may calculate the direction of movement by taking a single integration of the acceleration values and using the velocity vector.

Once the distance and direction of movement has been calculated (98), processor 40 may then transmit the distance and direction of computing device movement to remote server 18 such that remote server can update the position of computing device 12 (100). In some examples, processor 40 may calculate the distance and direction of the movement after each measurement of the device acceleration. In other examples, processor 40 may obtain multiple measurements over a predetermined period of time or until computing device 12 is motionless for a period of time. Then, processor 40 may calculate the distance and the direction of computing device movement based on multiple measurements to limit the number of calculations and the number of transmissions to remote server 18.

If processor 40 detects additional movement or detects that there is new position information to obtain ("YES" branch of block 100), processor 40 may continue to detect additional movement of computing device 12 (90) or obtain additional position information (86). If processor 40 does not detect additional movement or position information ("NO" branch of block 101), processor 40 may then receive supplemental information via network 16 and present the received supplemental information to the user using user interface 14 of computing device 12 (102). The supplemental information may thus be based on the position information 26, the calculated distance of movement, and the calculated direction of movement. As described herein, the task of calculating the movement of computing device 12 may be performed by processor 40, remote server 18, a different processor of the system, or some combination therein.

Figure 10A:
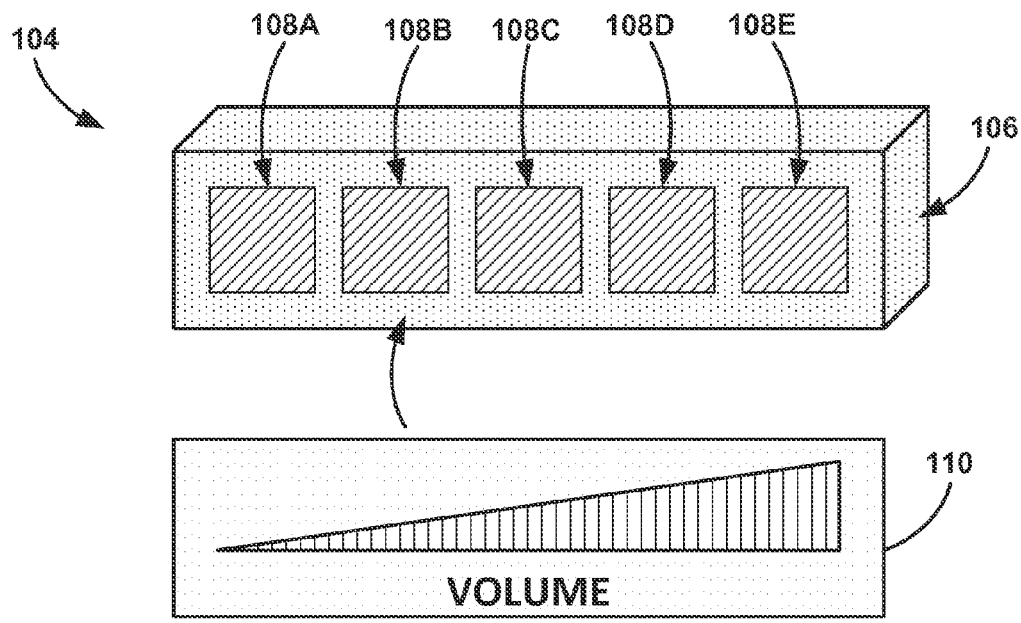
FIGS. 10A and 10B are conceptual diagrams illustrating an example visual representation of a control parameter and associated array of position devices.
Figure 10B:
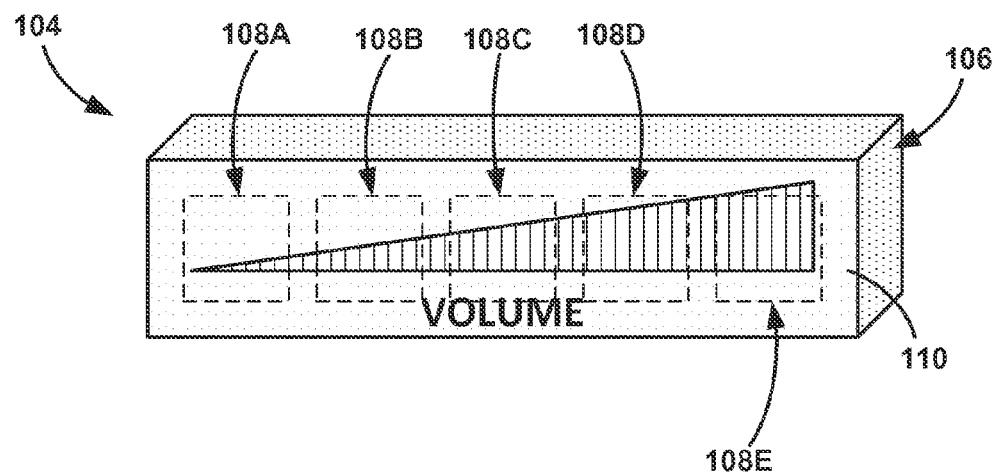

FIGS. 10A and 10B are conceptual diagrams illustrating an example visual representation 110 of a control parameter and associated array of position devices 108A, 108B, 108C, 108D, and 108E (collectively "position devices 108). Virtual controller 104 may include mounting surface 106, position devices 108, and visual representation 110. Computing device 12 may utilize virtual controller 104 to adjust a control parameter that defines operation of a target device (e.g., a sound system, a video system, a lighting system, a heating system, etc.). In other words, a user may adjust, modify, or change a control parameter of a target device by obtaining position information (e.g., position information 26) from one or more of position devices 108. As shown in the example of FIGS. 10A and 10B, visual representation 110 indicates that position devices 108 may be used to adjust a volume (e.g., a control parameter) of a target device based on the position information obtained from one or more of position devices 108.

As shown in FIG. 10A, mounting surface 106 may include an array of two or more position devices 108. Mounting surface 106 and position devices 108 may be similar to mounting surface 28 and position devices 24 of FIG. 3. Visual representation 110 may be any visual media that is then mounted onto mounting surface 106 to cover position devices 108. The resulting virtual controller 104 is provided in FIG. 10B such that the user of computing device 12 may only view visual representation 110. Virtual controller 104 may be a separate device such as an NFC tag or other device that can be interrogated to provide data to computing device 12. Visual representation 110 may then be adhered or otherwise mounted to the NFC tag. Alternatively, the content of visual representation 110 may be directly printed onto the NFC tag. The NFC tag, or array of NFC tags, may then be placed at any location the user desires to use virtual controller 104. For example, virtual controller 104 may be placed or adhered to walls, windows, doors, tables, furniture, electronic devices, or anywhere the user may desire to adjust the specified control parameter of the target device. A backside of virtual controller 104 may include an adhesive, hook and loop closure, or other mechanism to retain virtual controller 104 on the desired surface. As one example, virtual controller 104 that provides adjustments to a volume may be placed on a table to allow the user to adjust the volume of the target device (e.g., a music system).

In other examples, virtual controller 104 may be provided as a part of a larger visual media and mounting surface (e.g., visual media 22 and mounting surface 28). In this manner, virtual representation 110 may be a portion of a larger visual media 22. In addition, position devices 108 may be a subset of a larger array of position devices (e.g., position devices 24 of FIG. 4). Therefore, any array of position devices, or subset of an array of position devices, may be utilized to adjust a control parameter of a target device. For example, visual media 22 described herein may be an advertisement and/or include instructions on how to use a music jukebox. The user may move computing device 12 across visual media 22 to adjust the value of a control parameter (e.g., volume) of the jukebox. In addition, or alternatively, position devices 108 may be provided to toggle between songs playable by the jukebox or even move to a different time within the song (e.g., forward, reverse, skip ahead, pause, or even select a specific time point within the song).

As described above, visual representation 110 is shown to represent a slider for increasing and decreasing the volume of a target device. Visual representation 110 may be configured to represent the specific control parameter of which can be adjusted based on the position information from position devices 108. Adjusting the control parameter may include changing a value that defines the state of the control parameter. For example, visual representation 110 may provide a visual indication to control a channel, an input mode, one or more frequency bands of an equalizer, light intensity, position of an automated curtain, a temperature range, or any other such control parameter. In any example, computing device 12 may be used to adjust the control parameter identified by virtual controller 104 by moving computing device 12 to one of position devices 108 or between the array of position devices 108 located behind visual representation 110.

The user may thus select the desired volume level of the control parameter by moving computing device 12 to the appropriate position along visual representation 110 of virtual controller 104. Computing device 12 may obtain information from one or more position devices 24 using near-field communication. The position information may identify a position of the respective position device within the array of position devices 108 associated with visual representation 110 of a control parameter that at least partially defines operation of a target device. Computing device 12 may then transmit the obtained information (e.g., position information 26) from computing device 12 to remote server 18 (e.g., a networked device) configured to adjust the control parameter based on the obtained information. In other words, computing device 12 may not directly adjust the control parameter. Instead, remote server 18 may directly adjust the control parameter or command the target device to adjust the control parameter.

In some examples, computing device 12 may begin to adjust the control parameter after obtaining position information 26 from only one position device 108. For example, the user may place computing device 12 at the desired location along visual representation 110 to select a single value of the control parameter. In other examples, computing device 12 may adjust the control parameter based on obtaining position information 26 from two or more position devices. For example, computing device 12 may obtain position information from position device 108B and then obtain additional position information from position device 108C when computing device 12 is moved with respect to visual representation 110. The position information may identify a position of position devices 108B and 108C in relation to visual representation 110 of the control parameter. Computing device 12 may transmit all of the position information obtained, in the order in which it was obtained from position devices 108 to remote server 18. Remote server 18 may then update the adjustment of the control parameter based on the most recently obtained position information. In this manner, computing device 12 may transmit newly obtained position information from subsequent position devices 108 to remote server 18 to adjust the control parameter.

The control parameter may define operation of a target device. As indicated above, the target device may be any device capable of electronic control. For example, the target device may be used to provide entertainment, climate control, lighting, or any other service to the user. The target device may be a component of an audio system, a video component of a video system, a lighting control device, a thermostat that controls a heating and cooling system, a security system, or even another computing system. In this manner, the control parameter may be a volume control, a channel control, an input control, a light intensity control, a temperature control, a video camera directional control, or any other such parameter that at least partially defines the operation of the target device. The control parameter may thus be adjusted to a variety of values as desired by the user based on the position information obtained from position devices 108.

Computing device 12 may adjust the control parameter by obtaining position information from one or more position devices 108. In this manner, each of position devices 108 may have a distinct position that is representative of a magnitude of the control parameter with respect to visual representation 110 of the control parameter. For example, as the user moves computing device 12 to the right across visual representation 110, each subsequent position device 108 may be used to increase the volume of a volume control parameter. As described herein, the position information may include coordinates of the respective position device 108 that remote server 18 uses to identify the position of each position device 108 and the respective representative magnitude of the control parameter.

In addition, the control parameter may be at least partially adjusted based on the movement of computing device 12. As described herein, computing device 12 may utilize one or more sensors to detect movement of computing device 12 from a position device 108. Computing device 12 may then transmit the detected movement to remote server 18 such that remote server 18 may estimate the actual position of computing device 12 with respect to the previous position device 108 and visual representation 110. In other words, the detected movement of computing device 12 with respect to the most recently identified position device 108 may allow remote server 18 to resolve the position of computing device 12 with greater precision and accuracy than may otherwise be possible with only position information from position devices 108. Since there may be a gap between position devices 108, the exact position of computing device 12 between adjacent position devices may be difficult to determine. The detected movement may aid remote server 18 to better determine the position of computing device 12 and adjust the control parameter in smaller increments based on this more accurate position.

In one example, computing device 12 may detect movement using accelerations of computing device 12. Computing device 12 may include one or more accelerometers (e.g., a single-axis, two-axis, or three-axis accelerometer) that measure accelerations of computing device 12 after computing device 12 obtains position information from one of position devices 108. Computing device 12 may measure the accelerations continually or only in response to obtaining position information. Computing device 12 may then calculate a distance and a direction that computing device 12 was moved from the last identified position device 108 based on the measured accelerations. The distance computing device 12 has moved may be calculated, for example, by double integrating the acceleration measurements over time. Using this detected movement, remote server 18 may accordingly adjust the control parameter.

In another example, computing device may detect movement of computing device 12 using optically obtained information. Computing device 12 may capture a plurality of images with an optical sensor (e.g., camera 55) of computing device 12 as computing device 12 is moved with respect to visual representation 110. The optical sensor may be disposed on or within the housing of computing device 12. For example, the optical sensor may be disposed opposite user interface 14 such that the optical sensor is facing visual representation 110. As computing device 12 is moving, computing device 12 may begin capturing images in response to obtaining position information from any position device 108. In some examples, computing device 12 may only capture images if computing device 12 detects movement (e.g., based on output from accelerometer 53). Computing device 12 may control the capturing of images using other techniques in other examples. Computing device 12 may then analyze changes between the captured images to determine the distance computing device moves in between obtaining position information from position devices 108.

Using any technique to determine the movement of computing device 12, subsequent detection of one or more position devices 108 may be used to correct the estimation of computing device movement. For example, computing device 12 may obtain position information 26 a subsequent position device after obtaining position information from a previous position device 108. Based on the known distance between the identified positions of the two position devices 108 from the obtained position information, the detected movement of computing device 12 may be corrected. Although remote server 18 may correct the detected movement, computing device 12 may correct the detected movement in other examples.

Visual representation 110 of virtual controller 104 may take any form that is identifiable with the control parameter. For example, visual representation 110 may be a slider or a dial. In other examples, visual representation 110 of the control parameter may include a ramp, descriptive words (e.g., low and high), or even numerical indications of the control parameter magnitude. The visual representation may also be provided as printed media or an electronic display (e.g., a liquid crystal display, light emitting diodes, etc.). In other examples, virtual controller 104 may include visual representations of two or more control parameters. Virtual controller 104 may also include a sufficient number of position devices 108 so that computing device 12 can adjust each control parameter.

Generally, position information obtained from position devices 108 may include coordinates and/or a URL that indicates the position of each respective position device 108 within virtual controller 104. In this manner, transmission of the position information to remote server 18 may include a hypertext transfer protocol (HTTP) request to remote server 18 using the URL. In some examples, position information may also have a code or other identifier that identifies the control parameter and the target device of which can be adjusted based on the position of computing device 12. The user may use computing device 12 or a different computing device to initialize virtual controller 104 as linked to the specific target device and control parameter. In this manner, computing device 12 may even write data to one or more of position devices 108 to setup the link between position devices 12 and adjustment of the control parameter. Alternatively, virtual controller 104 may be preconfigured by a manufacturer for the target device. For example, computing device 12 may obtain information identifying remote server 18 wherein the information was stored in position devices 108 when position devices 108 were assembled into mounting surface 106.

Figure 11:
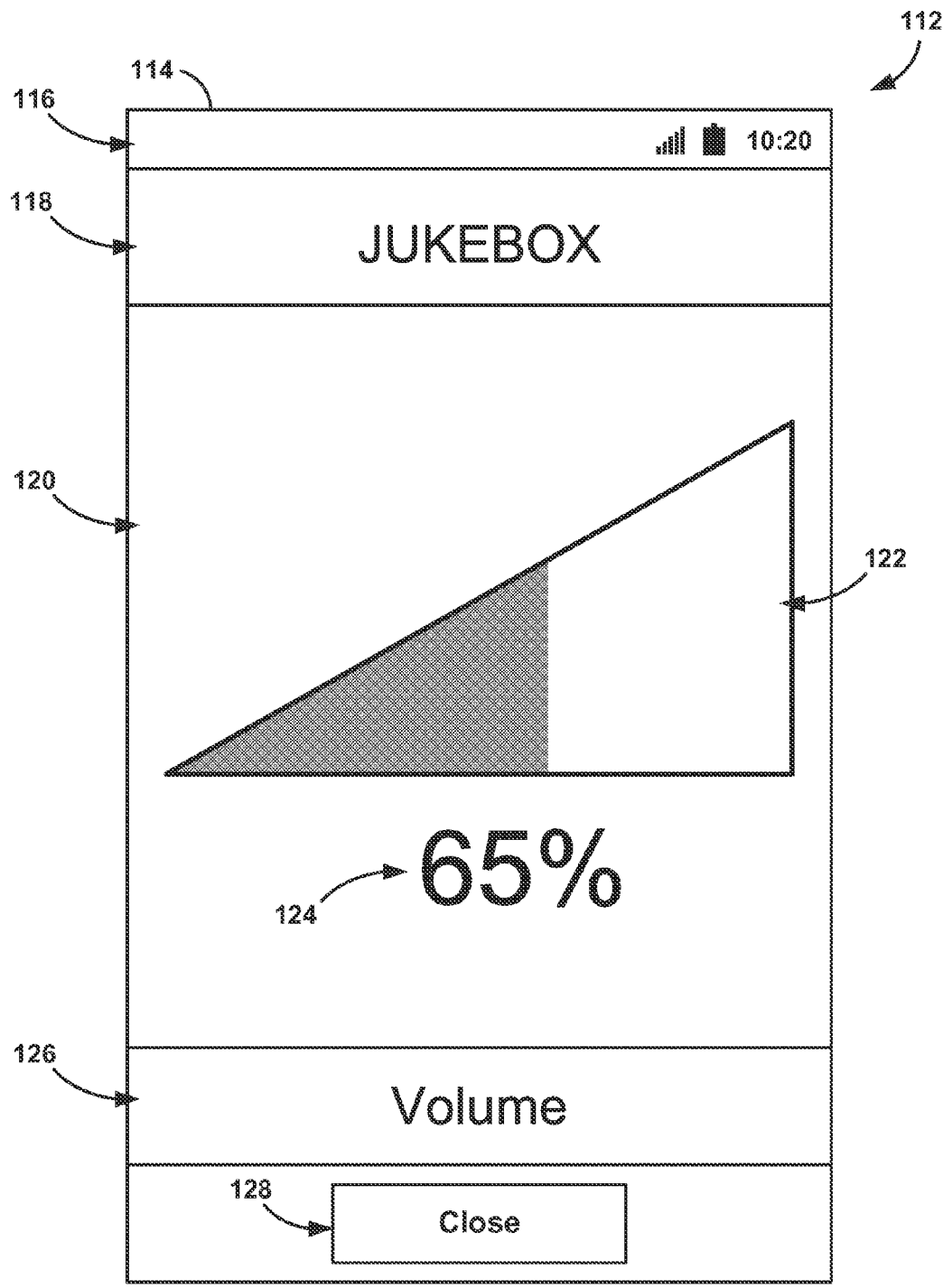
FIG. 11 is an illustration of an example user interface that displays a value of a control parameter.

FIG. 11 is an illustration of an example user interface 60 that displays a value 124 of a control parameter. Since the target device may be controlled by remote server 18 based on the position of computing device 12 with respect to position devices 108, computing device 12 may not be able to interpret position information to identify what adjustment will be made to the control parameter. Therefore, computing device 12 may receive the adjusted value of the control parameter from remote server 18 via network 16. In other words, remote server 18 may transmit the adjusted value to computing device 12 via network 16 after the adjustment has been made or upon determining the adjusted value of the control parameter. Computing device 12 may then present the adjusted value of the control parameter using user interface 14. Therefore, the user of computing device 12 may receive feedback as to how the control parameter has changed based on the movement of computing device 12 with respect to visual representation 110 of virtual controller 104.

User interface 112 is an example of user interface 14. As shown in FIG. 11, user interface 112 presents screen 114 to the user via computing device 12. Screen 114 includes status bar 116, target device field 118, value information 120, control parameter field 126, and close button 128. Screen 114 may be an example screen within application 58 of FIG. 2 (e.g., an application for providing supplemental information) running on computing device 12. For example, the supplemental information may include details about the adjusted control parameter and the target device.

Status bar 116 may include one or more icons that indicate the status of computing device 12 and/or applications running on computing device 12. For example, status bar 116 may present a time of day, battery charge level, network signal strength, application updates, received messages, or even notification that position information has been received from a position device 24. Target device field 118 may indicate the target device that is being at least partially controlled based on the adjusted control parameter. Target device field 118 indicates that "Jukebox" is the target device being controlled. Control parameter field 126 may indicate the control parameter that was just adjusted based on the position information and/or detected movement of computing device 12. Control parameter field 126 indicates that the control parameter of "Volume" has been adjusted.

Value information 120 may provide any information related to the adjustment of the identified control parameter. Value information 120 may include any graphical, numerical, or textual information to indicate the present value of the control parameter and/or how the value has been adjusted. In the example of FIG. 11, value information 120 includes value 124 and graph 122. Value 124 indicates the numerical value of the control parameter as it has been adjusted. Value 124 may be presented as a percentage of the total possible value of the control parameter (e.g., 65 percent of the total available volume) or as an absolute value of the control parameter (e.g., 85 decibels for volume). If computing device 12 is subsequently moved along virtual controller 104 to adjust the control parameter, computing device 12 may update value information 120 according to the received adjustment from remote server 18. Graph 122 provides a graphical indication of the currently adjusted control parameter. The shaded portion of graph 122 indicates the used volume level. In other words, the value of the control parameter would be set to maximum if the entire graph 122 was shaded.

Value 124 and graph 122 are examples of possible indications of the adjusted value of the control parameter. Value information 120 may include, in other examples, dials, bar graphs, text, or any other manner of displaying the value of the control parameter. In addition, value information 120 may provide values to different control parameters for the target device. Screen 114 may be presented automatically on computing device 12 in response to receiving the adjusted value of the control parameter from remote server 18. Alternatively, computing device 12 may prompt the user to view the control parameter or the user may navigate one or more menus of computing device 12 to initiate display of screen 114.

Figure 12:
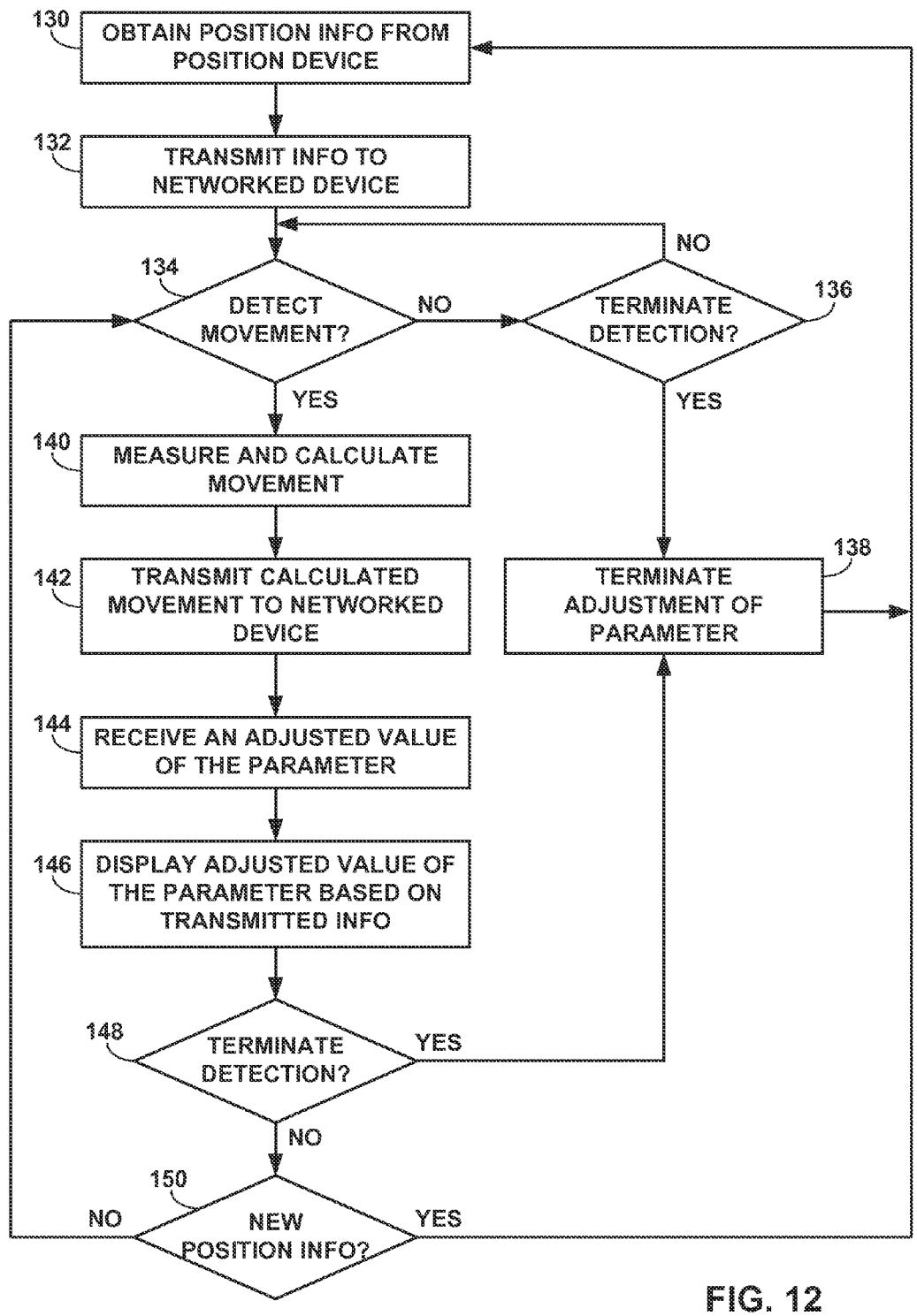
FIG. 12 is a flow diagram illustrating an example process that may be performed by a computing device to adjust a control parameter based on position information from a position device and detected movement of the computing device.

FIG. 12 is a flow diagram illustrating an example process that may be performed by a computing device (e.g., computing device 12) to adjust a control parameter based on position information from one of a group of position devices (e.g., position devices 108) and detected movement of the computing device. The process of FIG. 12 will be described below with respect to processor 40, but other processors, modules, applications, or any combination thereof, may perform the operations attributed to processor 40. Although the movement detection described in FIG. 11 is described with regard to accelerometer 53, other sensors such as camera 55 may be used instead to calculate the distance and direction computing device 12 has moved with respect to visual representation 110 and virtual controller 104.

Using short-range communication device 54 (e.g., an NFC device), processor 40 may obtain position information from one of position devices 108 when computing device 12 is placed proximate to visual representation 110 (130). Once processor 40 obtains the position information, processor 40 may transmit the position information to a network device such as remote server 18 via network 16 (132). Processor 40 may then start or continue to detect movement of computing device 12 with respect to virtual controller 104. Processor 40 may detect movement of computing device 12 immediately after transmitting position information 26 to remote server 18 or even in response to obtaining position information 26 at block 130. In some examples, processor 40 may receive parameter information from remote server 18 in parallel with detecting movement of computing device 12.

If processor 40 does not detect any movement of computing device 12 via accelerometer 53 ("NO" branch of block 134), processor 40 may check if the detection of movement is to be terminated (136). For example, processor 40 may receive a user input or other command that indicates the parameter is no longer to be adjusted or control of the target device is to be terminated. If processor 40 is commanded to terminate the detection ("YES" branch of block 136), processor 40 may terminate the adjustment of the parameter identified in the position information (138). If processor 40 is not commanded to terminate the detection of movement ("NO" branch of block 136), processor 40 may continue to detect movement of computing device 12 (134).

If processor 40 detects movement of computing device 12 based on a change in output from accelerometer 53 ("YES" branch of block 134), processor 40 may measure accelerations of computing device 12 (140). Processor 40 may command accelerometer 53 to being sensing accelerations or processor 40 may begin accessing accelerometer data to measure the accelerations. Using the acceleration values, processor 40 may calculate the distance computing device 12 has moved by double integrating the measured accelerations. Processor 40 may also calculate the direction computing device 12 has moved by determining the vector based on direction components of the distance values. Alternatively, processor 40 may calculate the direction of movement by taking a single integration of the acceleration values and using the velocity vector.

Once the distance and direction of movement has been calculated, processor 40 may transmit the calculated distance and direction of computing device movement to remote server 18 such that remote server can update the position of computing device 12 (142). Processor 40 may then receive the adjusted value of the control parameter via network 16 (144). Once the adjusted value of the control parameter is received by computing device 12, processor 40 may display the adjusted value of the control parameter that is based on the transmitted position information (146). For example, the adjusted value may be presented on screen 114 of FIG. 11.

If processor 40 next receives a command to terminate the detection of computing device movement (e.g., termination of target device control) ("YES" branch of block 148), processor 40 then terminates the adjustment of the parameter (138). Processor 40 may then obtain subsequent position information (130). If processor 40 does not receive any command or input to terminate the detection of movement ("NO" branch of block 148), processor 40 may determine if any new position information is detected (150). If no new position information is detected ("NO" branch of block 150), processor 40 may again detect movement of computing device 12 (134). If processor 40 detects new position information ("YES" branch of block 150), processor may again obtain additional position information from subsequent position devices 108 (130).

Although each operation of the technique in FIG. 12 is described in a linear fashion, some operations may occur simultaneously or in parallel. For example, processor 40 may continue to detect, measure, and calculate additional movement of computing device 12 while processor 40 is transmitting the calculated movement to remote server 18 and/or receiving an adjusted value of the parameter from remote server 18. In another example, the adjustment of the parameter and the control of the target device may be interrupted and/or terminated at any step in the process. Therefore, processor 40 or other components of computing device 12 may be performing multiple operations of FIG. 12 concurrently.

In other examples, the control parameter may be adjusted without detecting the movement of computing device 12. Remote server 18 may only adjust the control parameter upon receiving position information from computing device 12. In this example, the process of adjusting the value of the control parameter may follow operations 130, 132, 134, and 136 without any of the movement detection operations. Although position information from position devices 108 used without movement of computing device 12 may provide a more coarse adjustment to the control parameter, computing device 12 and remote server 18 may not need to perform the additional calculations to adjust the control parameter. In some examples, the user of computing device 12 may provide input to computing device 12 that enables or disables the use of detected movement to refine the adjustment of the control parameter. Alternatively, remote server 18 may automatically enable or disable adjustments based on detected movement of computing device 12 according to the hardware and/or software capabilities of computing device 12.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
   obtaining, by a near-field communication device of a computing device, position information from a position device using near-field communication, wherein the position information identifies a position of the position device in relation to a first portion of visual media associated with the position device;
   detecting, with a sensor of the computing device, movement of the computing device with respect to the position device, wherein the sensor is different than the near-field communication device;
   transmitting, to a networked device, the position information and information associated with the detected movement, wherein the information associated with the detected movement is different than the position information; and
   receiving, by the computing device, supplemental information that is provided by the networked device based at least in part on the position information and the information associated with the detected movement, wherein the supplemental information comprises additional information related to at least one of the first portion and a second portion of the visual media.

2. The method of claim 1, further comprising:
   transmitting the position information and the information associated with the detected movement to the networked device over a network.

3. The method of claim 1, wherein the position device is one of an array of position devices associated with the visual media.

4. The method of claim 3, wherein the array comprises a plurality of position devices arranged in a two-dimensional grid pattern.

5. The method of claim 1, wherein the position information comprises coordinates that identify the position of the position device within a mounting surface associated with the visual media.

6. The method of claim 1, wherein the position information is obtained when the computing device is placed proximate to the position device and the portion of the visual media.

7. The method of claim 1, wherein the visual media comprises one of a printed media or an electronic display, and wherein the visual media is mounted on a mounting surface that includes the position device.

8. The method of claim 1, wherein the position device is a first position device and the portion of the visual media is a first portion of the visual media, the method further comprising:
   obtaining, with the computing device, position information from a second position device using near-field communication that identifies a position of the second position device in relation to a third portion of the visual media associated with the second position device; and
   retrieving supplemental information associated with the third portion of the visual media based on the position information from the second position device.

9. The method of claim 1, wherein detecting movement of the computing device comprises:
   measuring one or more accelerations of the computing device after obtaining the position information; and
   calculating a distance and direction the computing device was moved with respect to the position device based on the measured accelerations.

10. The method of claim 1, wherein detecting movement of the computing device comprises:
    capturing a plurality of images with the sensor of the computing device, wherein each of the plurality of images includes at least part of the visual media;
    analyzing the plurality of images for at least one common feature of the visual media; and
    calculating a distance and direction the computing device was moved with respect to the position device based on a distance and a direction the at least one common feature of the visual media moved between the captured plurality of images.

11. The method of claim 1, wherein the position device is a first position device, the method further comprising:
    obtaining, with the computing device, position information from a second position device using near-field communication that identifies a position of the second position device in relation to a third portion of the visual media associated with the second position device; and
    correcting the detected movement to a distance between the position of the first position device and the position of the second position device.

12. The method of claim 1, wherein the supplemental information comprises a uniform resource locator configured to direct a browser of the computing device to web-based content associated with the portion of the visual media at least partially identified by the position information.

13. The method of claim 1, wherein the position information comprises a uniform resource locator configured to direct a browser of the computing device to the networked device, and wherein the networked device is controlled by a service that has mapped the portion of the visual media to the position device.

14. The method of claim 13, wherein the retrieved supplemental information is a subset of supplemental information related to different portions of the visual media and stored by the service.

15. The method of claim 1, further comprising:
displaying the supplemental information on the computing device.

16. The method of claim 1, wherein the position device includes passive near-field communication hardware.

17. The method of claim 1, wherein the computing device is a mobile device.

18. A computer-readable storage device encoded with instructions that cause one or more processors of a computing device to perform operations comprising:
obtain, by a near-field communication device of the computing device, position information from a position device using near-field communication, wherein the position information identifies a position of the position device in relation to a first portion of visual media associated with the position device;
detect, with a sensor of the computing device, movement of the computing device with respect to the position device, wherein the sensor is different than the near-field communication device;
transmit, to a networked device, the position information and information associated with the detected movement, wherein the information associated with the detected movement is different than the position information; and
receive, by the computing device, supplemental information that is provided by the networked device based at least in part on the position information and the information associated with the detected movement, wherein the supplemental information comprises additional information related to at least one of the first portion and a second portion of the visual media.

19. A computing device comprising:
a near-field communication module configured to obtain position information from a position device using near-field communication, wherein the position information identifies a position of the position device in relation to a first portion of visual media associated with the position device;
a sensor configured to detect movement of the computing device with respect to the position device, wherein the sensor is different than the near-field communication module; and
at least one processor configured to:
transmit, to a networked device, the position information and information associated with the detected movement, wherein the information associated with the detected movement is different than the position information; and
receive supplemental information that is provided by the networked device based at least in part on the position information and the information associated with the detected movement, wherein the supplemental information comprises additional information related to at least one of the first portion and a second portion of the visual media.

* * * * *